United States Patent
Miyazaki et al.

(10) Patent No.: US 12,002,460 B2
(45) Date of Patent: Jun. 4, 2024

(54) INFORMATION PROCESSING DEVICE, INFORMATION PROCESSING SYSTEM, AND INFORMATION PROCESSING METHOD, AND PROGRAM

(71) Applicant: SONY GROUP CORPORATION, Tokyo (JP)

(72) Inventors: Chiaki Miyazaki, Tokyo (JP); Juri Yaeda, Tokyo (JP); Saki Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 395 days.

(21) Appl. No.: 17/309,555

(22) PCT Filed: Oct. 10, 2019

(86) PCT No.: PCT/JP2019/039978
§ 371 (c)(1),
(2) Date: Jun. 4, 2021

(87) PCT Pub. No.: WO2020/121638
PCT Pub. Date: Jun. 18, 2020

(65) Prior Publication Data
US 2022/0020369 A1   Jan. 20, 2022

(30) Foreign Application Priority Data
Dec. 13, 2018 (JP) ................................ 2018-233645

(51) Int. Cl.
*G10L 15/22* (2006.01)
*G06F 40/289* (2020.01)
(Continued)

(52) U.S. Cl.
CPC ............ *G10L 15/22* (2013.01); *G06F 40/289* (2020.01); *G10L 15/26* (2013.01); *G10L 15/30* (2013.01)

(58) Field of Classification Search
CPC ... G10L 15/22; G10L 2015/233; G10L 15/26; G10L 15/30; G10L 13/027; G06F 40/289
See application file for complete search history.

(56) References Cited

U.S. PATENT DOCUMENTS

2009/0070113 A1* 3/2009 Gupta .................... G10L 15/22
                                                                 704/257
2017/0103757 A1* 4/2017 Yamamoto .......... G10L 15/1807
(Continued)

FOREIGN PATENT DOCUMENTS

JP    62-233830 A    10/1987
JP    10-326176 A    12/1998
(Continued)

OTHER PUBLICATIONS

International Search Report and Written Opinion of PCT Application No. PCT/JP2019/039978, dated Dec. 24, 2019, 08 pages of ISRWO.

*Primary Examiner* — Abul K Azad
(74) *Attorney, Agent, or Firm* — CHIP LAW GROUP

(57) ABSTRACT

A device and a method that determine an utterance type of a user utterance and generate a system response according to a determination result are achieved. A user utterance type determination unit that determines an utterance type of a user utterance, and a system response generation unit that generates a system response according to a type determination result determined by the user utterance type determination unit are included. The user utterance type determination unit determines whether the user utterance is of type A that requests all reutterances of a system utterance immediately before the user utterance, or type B that requests a (Continued)

reutterance of a part of the system utterance immediately before the user utterance. The system response generation unit generates a system response to reutter all system utterances immediately before the user utterance in a case where the user utterance is of type A, and generates a system response to reutter a part of system utterances immediately before the user utterance in a case where the user utterance is of type B.

12 Claims, 20 Drawing Sheets

(51) Int. Cl.
  *G10L 15/26*   (2006.01)
  *G10L 15/30*   (2013.01)

(56) References Cited

U.S. PATENT DOCUMENTS

2018/0314689 A1* 11/2018 Wang ................. G10L 15/1822
2020/0117714 A1* 4/2020 Mack .................... G06F 16/685

FOREIGN PATENT DOCUMENTS

| | | |
|---|---|---|
| JP | 2002-132811 A | 5/2002 |
| JP | 2003-228389 A | 8/2003 |
| JP | 2007-121577 A | 5/2007 |
| JP | 2010-197858 A | 9/2010 |
| JP | 2013-072887 A | 4/2013 |
| JP | 2018-087871 A | 6/2018 |

* cited by examiner

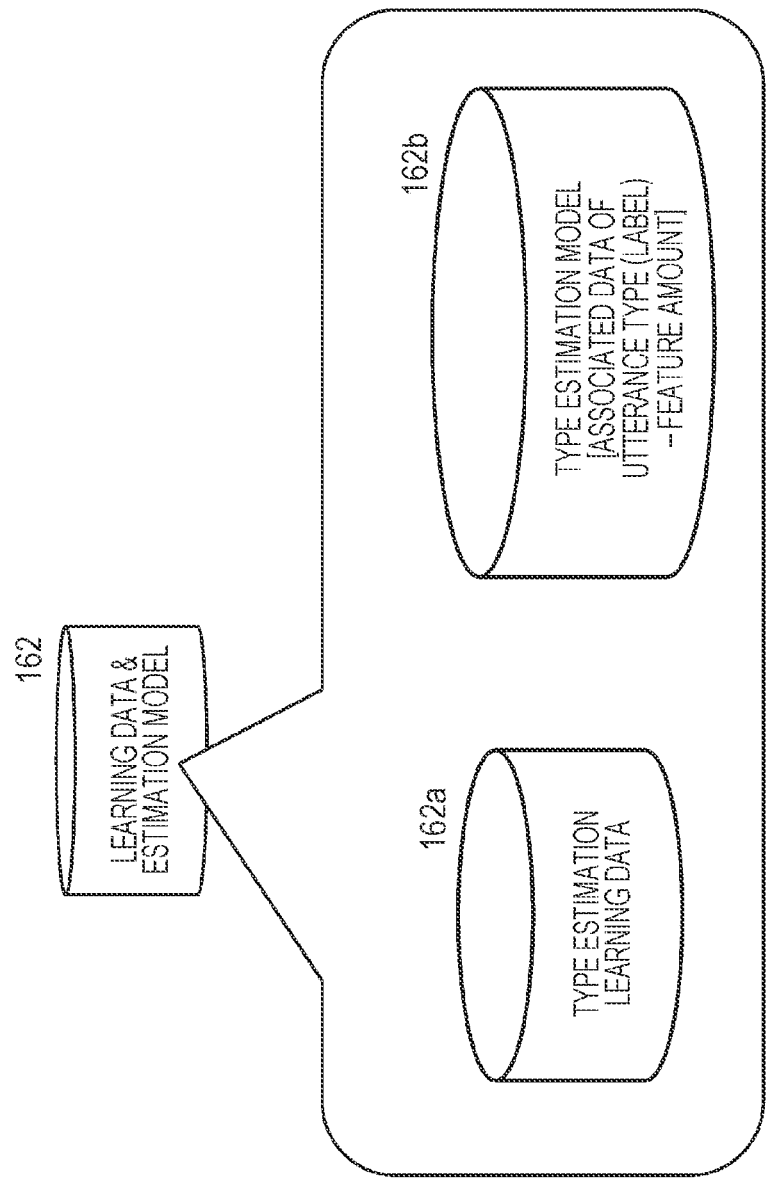

FIG. 9

| | (A) SYSTEM UTTERANCE IMMEDIATELY BEFORE USER UTTERANCE | (B) USER UTTERANCE | (C) LABEL (= UTTERANCE TYPE) |
|---|---|---|---|
| (1) | HEAVY RAIN IS EXPECTED TOMORROW AFTERNOON | WHAT DID YOU SAY NOW | A |
| (2) | SCHEDULE FOR 24TH IS MEETING AT 8 AM, LUNCH PARTY AT 12 PM, MEETING AT 5 PM | EXCUSE ME | A |
| (3) | SCHEDULE FOR 24TH IS MEETING AT 8 AM, LUNCH PARTY AT 12 PM, MEETING AT 5 PM | WHAT DID YOU SAY AFTER MEETING AT 8 AM | B1 |
| (4) | HEAVY RAIN IS EXPECTED TOMORROW AFTERNOON | WHAT DID YOU SAY BEFORE HEAVY RAIN IS EXPECTED | B1 |
| (5) | REMOVE SCALES AND SPRINKLE WITH SALT | WHAT TO DO AFTER REMOVING SCALES | B2 |
| (6) | SCHEDULE FOR 24TH IS MEETING AT 8 AM, LUNCH PARTY AT 12 PM, MEETING AT 5 PM | WHAT IS SCHEDULED BEFORE LUNCH PARTY | B2 |
| (7) | SCHEDULE TO VISIT OSAKA THIS WEEK, AND AICHI NEXT WEEK | WHERE AM I GOING TO VISIT NEXT WEEK | B3 |
| (8) | TREE PLANTING OF CHERRY BLOSSOM TOOK PLACE | WHAT IS PLANTED | B3 |
| (9) | HERE IS RECIPE FOR OMELET RICE | WHAT IS CALORIE OF ONE EGG | C |
| (10) | TREE PLANTING OF CHERRY BLOSSOM TOOK PLACE | WHAT IS TREE PLANTING | C |
| (11) | SCHEDULE FOR 24TH IS MEETING AT 8 AM, LUNCH PARTY AT 12 PM, MEETING AT 5 PM | SHOW ME LATEST NEWS | OTHERS |
| (12) | SCHEDULE FOR 24TH IS MEETING AT 8 AM, LUNCH PARTY AT 12 PM, MEETING AT 5 PM | SHOW ME LIST OF RECIPES FOR EGG DISHES | OTHERS |

FIG. 14

(EXAMPLE 1)
USER UTTERANCE
= WHAT DID YOU SAY AFTER BEAT EGG

| MORPHEME | | LABEL (IOB2 TAG) |
|---|---|---|
| NOTATION | PART OF SPEECH | |
| EGG | NOUN | B-START |
| WO | PARTICLE | I-START |
| BEAT | VERB | I-START |
| TE | PARTICLE | I-START |
| NO | PARTICLE | O |
| AFTER | NOUN | O |
| NI | PARTICLE | O |
| WHAT | NOUN | O |
| TE | PARTICLE | O |
| SAY | VERB | O |
| TA | AUXILIARY VERB | O |

(EXAMPLE 2)
USER UTTERANCE
= SAY AGAIN BEFORE SPRINKLE SALT AND PEPPER

| MORPHEME | | LABEL (IOB2 TAG) |
|---|---|---|
| NOTATION | PART OF SPEECH | |
| SALT | NOUN | B-END |
| PEPPER | NOUN | I-END |
| WO | PARTICLE | I-END |
| SPRINKLE | VERB | I-END |
| MASU | AUXILIARY VERB | I-END |
| NO | PARTICLE | O |
| BEFORE | NOUN | O |
| WO | PARTICLE | O |
| AGAIN | ADVERB | O |
| SAY | VERB | O |
| TE | PARTICLE | O |

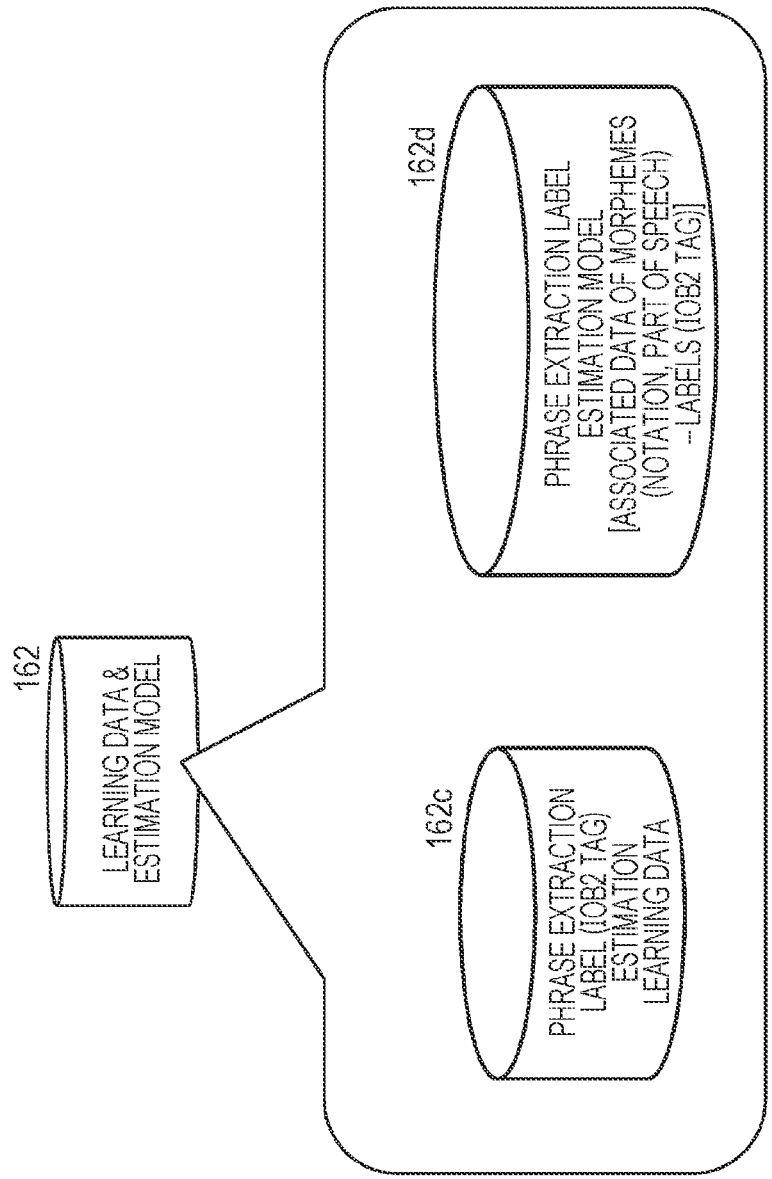

FIG. 16

| | | (A) STRUCTURE IN WHICH TIME ORDER OF PHRASES IS DEFINED | (B) STRUCTURE IN WHICH ONLY PART OF TIME ORDER OF PHRASES IS DEFINED | (C) STRUCTURE IN WHICH TIME ORDER OF PHRASES IS NOT DEFINED |
|---|---|---|---|---|
| (1) | EXAMPLE OF RECIPE SEARCH | ORDER / HOW TO MAKE:<br>1. BREAK THREE EGGS<br>2. PUT THEM IN BOWL<br>3. BEAT EGGS<br>4. SPRINKLE WITH SALT AND PEPPER<br>5. HEAT BUTTER OVER FIRE | ORDER / HOW TO MAKE:<br>1. BREAK THREE EGGS AND PUT THEM IN BOWL<br>2. BEAT EGGS AND SPRINKLE WITH SALT AND PEPPER<br>3. HEAT BUTTER OVER FIRE | BREAK THREE EGGS AND PUT THEM IN BOWL. NEXT, BEAT EGGS AND SPRINKLE WITH SALT AND PEPPER. HEAT BUTTER OVER FIRE. |
| (2) | EXAMPLE OF SCHEDULE CHECK | TIME / PLAN:<br>13:00 MEETING<br>19:00 SOCIAL GATHERING | | THERE ARE MEETING AT 13:00 AND SOCIAL GATHERING AT 19:00 |
| (3) | EXAMPLE OF NEWS SEARCH | TIME / EVENT:<br>t1 PRIME MINISTER WILL ATTEND MEETING<br>t2 PRIME MINISTER WILL HAVE DINNER WITH STAFFS | | PRIME MINISTER WILL ATTEND MEETING, AND THEREAFTER HAVE DINNER WITH STAFFS |

FIG. 17
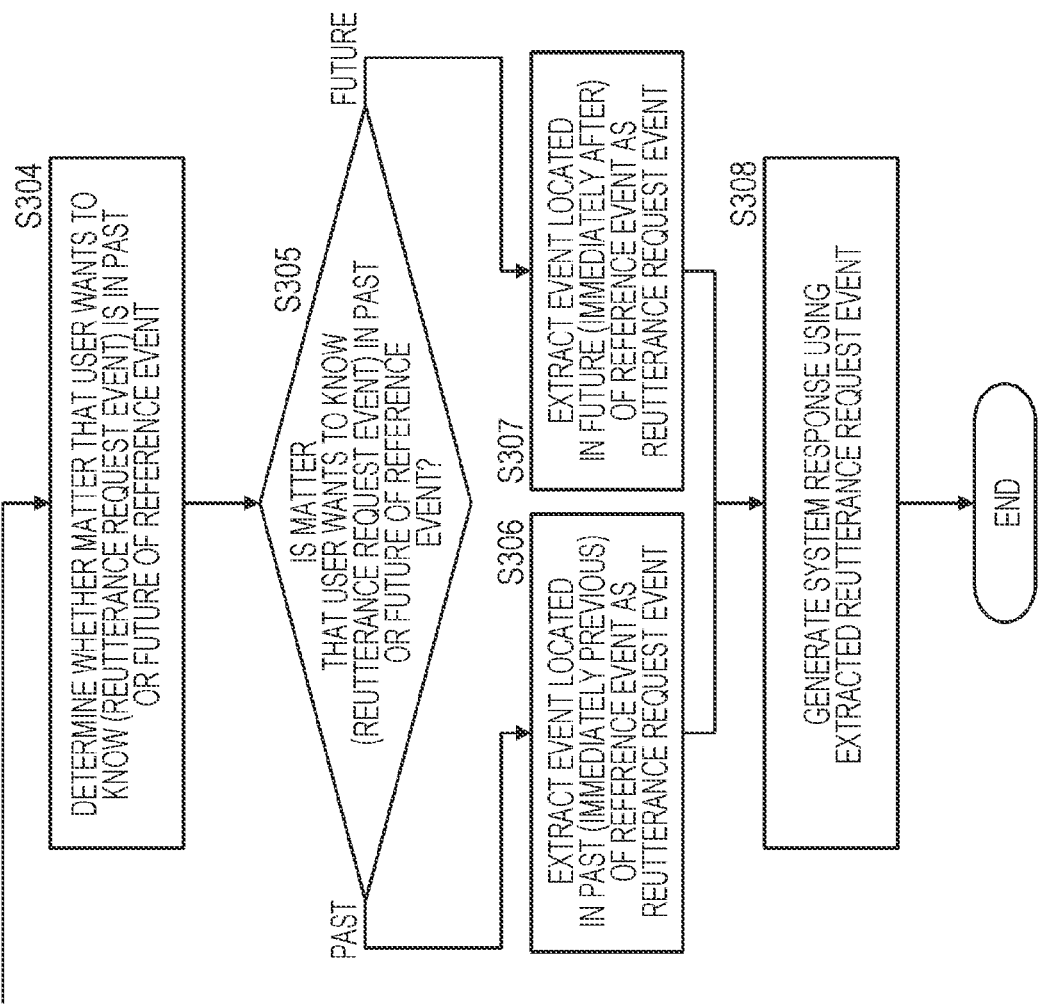
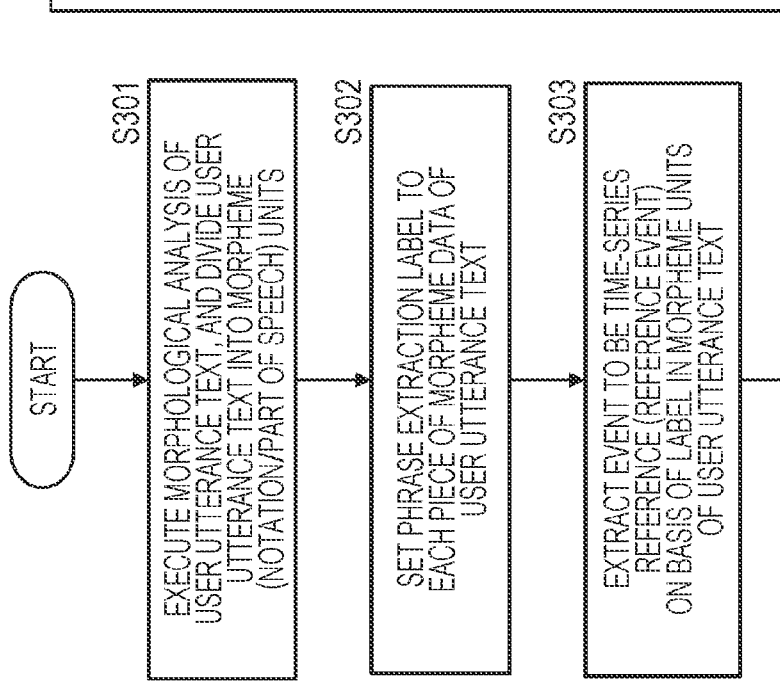

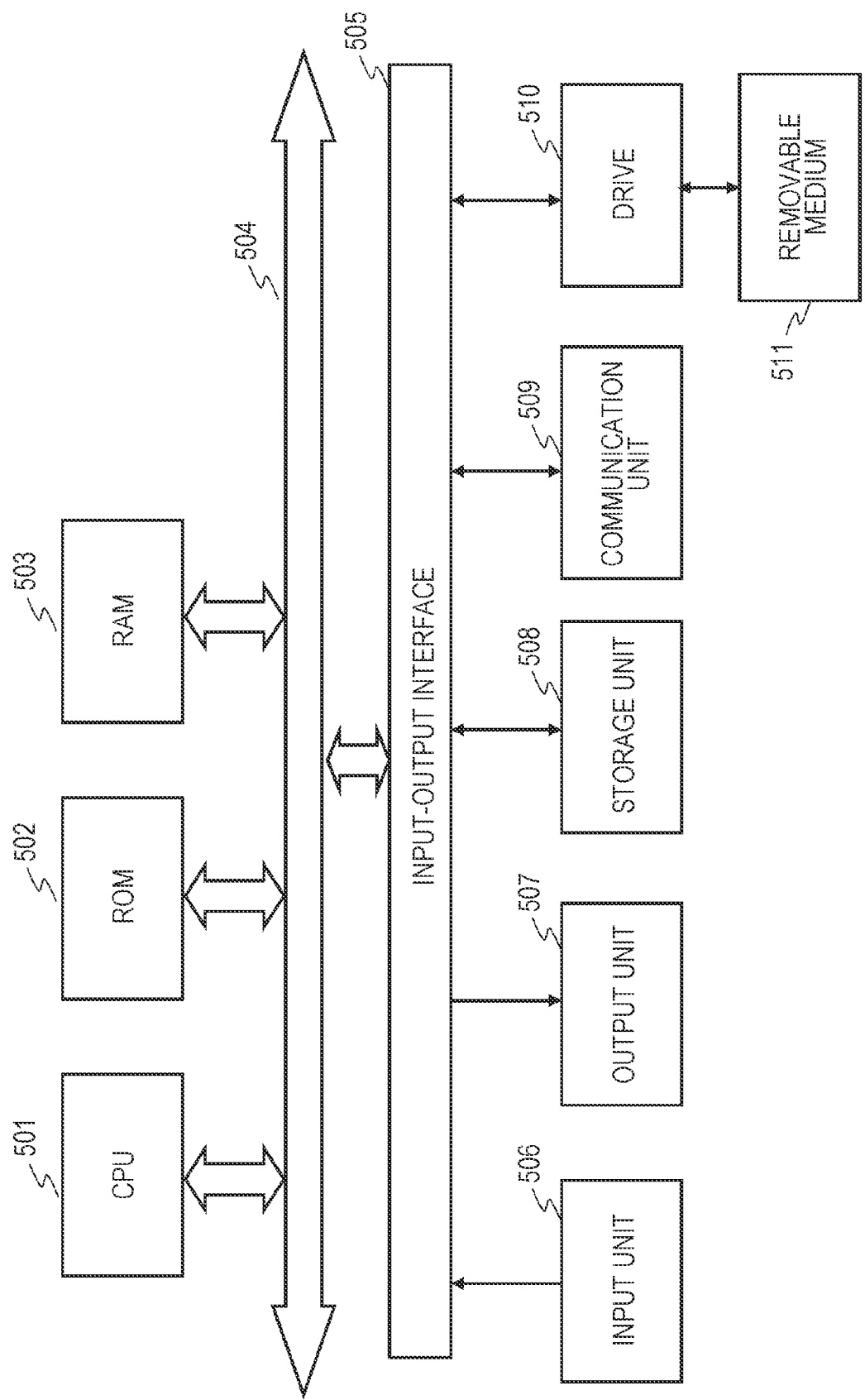

INFORMATION PROCESSING DEVICE, INFORMATION PROCESSING SYSTEM, AND INFORMATION PROCESSING METHOD, AND PROGRAM

TECHNICAL FIELD

The present disclosure relates to an information processing device, an information processing system, and an information processing method, and a program. More specifically, the present disclosure relates to an information processing device, an information processing system, and an information processing method, and a program that analyze a user utterance of a reutterance request or the like from a user for a system utterance output by a system capable of interacting with the user, and perform optimum processing according to an analysis result.

BACKGROUND ART

In recent years, use of voice recognition systems that perform voice recognition of user utterances and perform various processes and responses based on recognition results is increasing.

A voice recognition system analyzes a user utterance input through a microphone and performs processing according to an analysis result.

For example, in a case where the user utters "Tell me the weather tomorrow", weather information is acquired from a weather information providing server, a system response based on the acquired information is generated, and the generated response is output from a speaker. Specifically, for example, System utterance="Tomorrow's weather will be fine, but there may be thunderstorms in the evening"

Such a system utterance is output.

However, the user may miss the system utterance output from the voice recognition system, and in such a case, the user may make a user utterance such as "say again" to the system.

However, after a long utterance of the system, the user may desire to hear only a part of the utterance again. In such a case, if the system makes a long utterance from the beginning again, the user has to repeatedly hear unnecessary information, resulting in wasted time.

As prior arts that disclose a voice dialogue system that solves such a problem, for example, there are Patent Document 1 (Japanese Patent Application Laid-Open No. 2003-228389) and Patent Document 2 (Japanese Patent Application Laid-Open No. 2007-121577).

Patent Document 1 discloses a response reading device that enables the user to listen to only necessary information in a case where the user wants to listen to a part repeatedly in a scene where the system is making a long utterance such as news information or e-mail text.

However, the configuration of Patent Document 1 can process a user utterance only when specific predefined words such as "when", "what", and "how" are included in the user utterance, and cannot respond to a case where these specific words are not included.

Patent Document 2 also discloses a mechanism that, when a user asks, for example, "What is the weather tomorrow?" while the system utterance is being executed, the system jumps from the already uttered system utterance to a position that matches "Tomorrow's weather" and reads after this point aloud again.

However, this configuration has a problem that it cannot respond to a case where a matching portion between the user utterance and the system utterance cannot be found.

Moreover, Patent Document 3 (Japanese Patent Application Laid-Open No. 2002-132811) discloses a configuration for answering questions between a user and a system.

With respect to a user question, the system extracts an answer to the user question from a document (article) set and answers on the basis of the extraction result.

However, when answer processing using a general document (article) set that is not necessarily related to such system utterances, for example, the following problem may occur.

(1) System utterance: "Apples produced in Nagano Prefecture are called Shinshu apples"

(2) User utterance (question): "Where are the apples produced"

(3) System utterance (answer): "It's Aomori Prefecture"

In the above-described example, although the user utterance (question) in (2) described above: "Where are the apples produced" has an intention of the user to ask about the production area of the Shinshu apple, when the system makes the system utterance (answer) of (3), processing is performed in consideration of only this user utterance, (2) User utterance (question): "Where are the apples produced", and an answer different from the answer that the user wanted to hear is output.

In this manner, simply answering a question causes a problem that the user cannot obtain the answer that he or she really wants to hear.

CITATION LIST

Patent Document

Patent Document 1: Japanese Patent Application Laid-Open No. 2003-228389
Patent Document 2: Japanese Patent Application Laid-Open No. 2007-121577
Patent Document 3: Japanese Patent Application Laid-Open No. 2002-132811

SUMMARY OF THE INVENTION

Problems to be Solved by the Invention

The present disclosure has been made in view of the above problem, and it is an object thereof to provide, for example, an information processing device, an information processing system, and an information processing method, and a program capable of analyzing a user utterance such as a reutterance request from the user for a system utterance, and performing optimum processing according to an analysis results.

Solutions to Problems

A first aspect of the present disclosure is an information processing device including:
  a user utterance type determination unit that determines an utterance type of a user utterance; and
  a system response generation unit that generates a system response according to a type determination result determined by the user utterance type determination unit, in which the user utterance type determination unit determines which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation unit generates a system response to reutter all system utterances immediately before the user utterance in a case where the user utterance is of type A, and generates a system response to reutter a part of system utterances immediately before the user utterance in a case where the user utterance is of type B.

Moreover, a second aspect of the present disclosure is an information processing system including a user terminal and a data processing server, in which the user terminal has:

a voice input unit that inputs a user utterance; and a communication unit that transmits the input user utterance to the data processing server, the data processing server has:

a user utterance type determination unit that determines an utterance type of the user utterance received from the user terminal; and a system response generation unit that generates a system response according to a type determination result determined by the user utterance type determination unit, and the user utterance type determination unit determines which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation unit generates a system response to reutter all system utterances immediately before the user utterance in a case where the user utterance is of type A, and generates a system response to reutter a part of system utterances immediately before the user utterance in a case where the user utterance is of type B.

Moreover, a third aspect of the present disclosure is an information processing method executed in an information processing device, the method including:

a user utterance type determination step in which a user utterance type determination unit determines an utterance type of a user utterance; and a system response generation step in which a system response generation unit generates a system response according to a type determination result in the user utterance type determination step, in which the user utterance type determination step determines which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation step generates a system response to reutter all system utterances immediately before the user utterance in a case where the user utterance is of type A, and generates a system response to reutter a part of system utterances immediately before the user utterance in a case where the user utterance is of type B.

Moreover, the fourth aspect of the present disclosure is an information processing method executed in an information processing system including a user terminal and a data processing server, in which the user terminal inputs a user utterance via a voice input unit and transmits the user utterance to the data processing server, the data processing server executes a user utterance type determination process that determines an utterance type of the user utterance received from the user terminal, and a system response generation process that generates a system response according to a type determination result determined by the user utterance type determination unit, the user utterance type determination process determines which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation process generates a system response to reutter all system utterances immediately before the user utterance in a case where the user utterance is of type A, and generates a system response to reutter a part of system utterances immediately before the user utterance in a case where the user utterance is of type B.

Moreover, a fifth aspect of the present disclosure is a program that causes an information processing device to execute information processing including:

a user utterance type determination step of causing a user utterance type determination unit to determine an utterance type of a user utterance; and a system response generation step of causing a system response generation unit to generate a system response according to a type determination result in the user utterance type determination step, in which the user utterance type determination step performs a process to determine which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation step performs a process to generate a system response to reutter all system utterances immediately before the user utterance in a case where the user utterance is of type A, and generate a system response to reutter a part of system utterances immediately before the user utterance in a case where the user utterance is of type B.

Note that a program of the present disclosure is a program that can be provided by, for example, a storage medium or a communication medium provided in a computer-readable format to an information processing device or a computer system that can execute various program codes. By providing such a program in a computer-readable format, processing corresponding to the program is implemented on the information processing device or the computer system.

Other objects, features, and advantages of the present disclosure will become apparent from a more detailed description based on embodiments of the present disclosure described below and the accompanying drawings. Note that a system in the present description is a logical set configuration of a plurality of devices, and is not limited to one in which devices with respective configurations are in the same housing.

Effects of the Invention

According to a configuration of one embodiment of the present disclosure, a device and a method that determine an utterance type of a user utterance and generate a system response according to a determination result are achieved.

Specifically, for example, it has a user utterance type determination unit that determines an utterance type of a user utterance, and a system response generation unit that generates a system response according to a type determination result determined by the user utterance type determination unit. The user utterance type determination unit determines whether the user utterance is of type A that requests all reutterances of a system utterance immediately before the user utterance, or type B that requests a reutterance of a part of the system utterance immediately before the user utterance. The system response generation unit generates a system response to reutter all system utterances immediately before the user utterance in a case where the user utterance is of type A, and generates a system response to reutter a part of system utterances immediately before the user utterance in a case where the user utterance is of type B.

With this configuration, a device and a method that determine an utterance type of a user utterance and generate a system response according to a determination result are achieved.

Note that effects described in the present description are merely examples and are not limited, and additional effects may be provided.

BRIEF DESCRIPTION OF DRAWINGS

FIG. 8 is a diagram describing a configuration example of a learning data & estimation model in a storage unit of the information processing device.

FIG. 9 is a diagram describing a data configuration example of type estimation learning data.

FIG. 14 is a diagram describing label setting data corresponding to morphemes generated by the specified position partial reutterance unit of the information processing device.

FIG. 15 is a diagram describing a configuration example of a learning data & estimation model in a storage unit of the information processing device.

FIG. 16 is a diagram describing a data configuration example of an information source used by a specified time-series partial reutterance unit of the information processing device.

FIG. 17 is a diagram illustrating a flowchart describing a processing sequence executed by the specified time-series partial reutterance unit of the information processing device.

FIG. 20 is a diagram describing a hardware configuration example of the information processing device.

MODE FOR CARRYING OUT THE INVENTION

Figure 1:
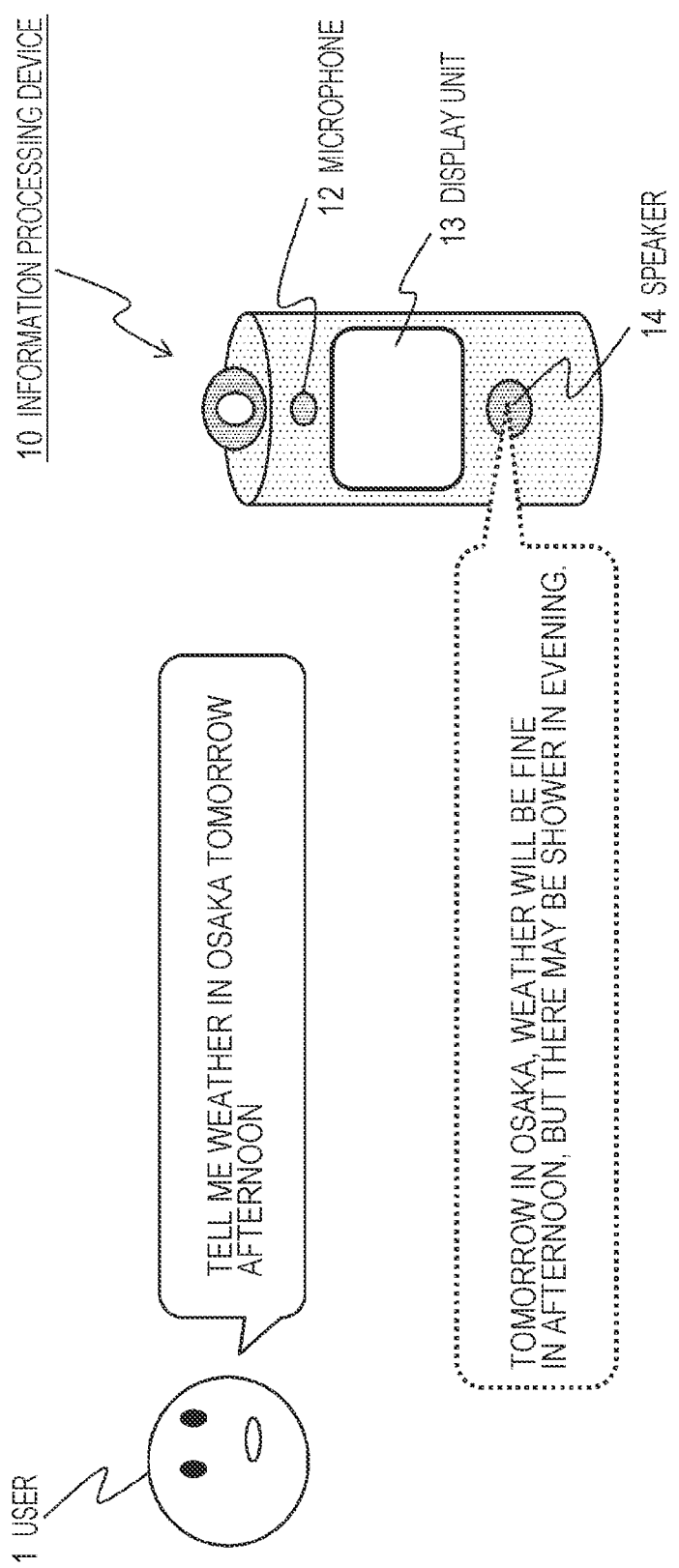
FIG. 1 is a diagram describing an example of an information processing device that performs a response or processing based on a user utterance.

Hereinafter, details of an information processing device, an information processing system, and an information processing method, and a program of the present disclosure will be described with reference to the drawings. Note that the description will be made according to the following items.

1. Outline of processing executed by information processing device
2. Configuration example of information processing device
3. Overall sequence of processes executed by information processing device
4. User utterance type determination process executed by user utterance type determination unit
5. Processing executed by reutterance processing unit (type A, B processing unit)
5-1. Processing executed by reutterance unit (type A processing unit) that generates system utterance (response) in case where utterance type of user utterance is type A
5-2. Processing executed by specified position partial reutterance unit (type B1 processing unit) that generates system utterance (response) in case where utterance type of user utterance is type B1
5-3. Processing executed by specified time-series partial reutterance unit (type B2 processing unit) that generates system utterance (response) in case where utterance type of user utterance is type B2
5-4. Processing executed by local question partial reutterance unit (type B3 processing unit) that generates system utterance (response) in case where utterance type of user utterance is type B3
6. Processing executed by general question processing unit (type C processing unit) that generates system utterance (response) in case where utterance type of user utterance is type C 7. Processing executed by task processing unit that generates system utterance (response) in case where utterance type of user utterance is none of types A to C
8. Configuration examples of information processing device and information processing system
9. Hardware configuration example of information processing device
10. Summary of configuration of present disclosure

[1. Outline of Processing Executed by Information Processing Device]

First, with reference to FIG. 1 and so on, an outline of a configuration and processing of an information processing device 10 that recognizes and responds to a user utterance will be described.

FIG. 1 is a diagram illustrating a processing example of the information processing device 10.

The information processing device 10 executes a voice recognition process of a user utterance, for example, User utterance="Tell me the weather in Osaka tomorrow afternoon".

Moreover, the information processing device 10 executes processing based on a voice recognition result of the user utterance.

In the example illustrated in FIG. 1, data for responding to the user utterance="Tell me the weather in Osaka tomorrow afternoon" is acquired, a response is generated on the basis of the acquired data, and the generated response is output via a speaker 14.

In the example illustrated in FIG. 1, the information processing device 10 makes the following system utterances.

System utterance="Tomorrow in Osaka, the weather will be fine in the afternoon, but there may be a shower in the evening."

The information processing device 10 executes a voice synthesis process (Text To Speech (TTS)) to generate and output the above-described system utterance.

The information processing device 10 generates and outputs a response by using the knowledge data acquired from a storage unit in the device or knowledge data acquired via the network.

The information processing device 10 illustrated in FIG. 1 includes a microphone 12, a display unit 13, and a speaker 14, and has a configuration capable of performing voice input and output and image output.

The information processing device 10 illustrated in FIG. 1 is called, for example, a smart speaker or an agent device.

Note that the voice recognition process and a semantic analysis process for a user utterance may be performed in the information processing device 10, or may be executed in a data processing server, which is one of servers 20 on the cloud side.

Figure 2:
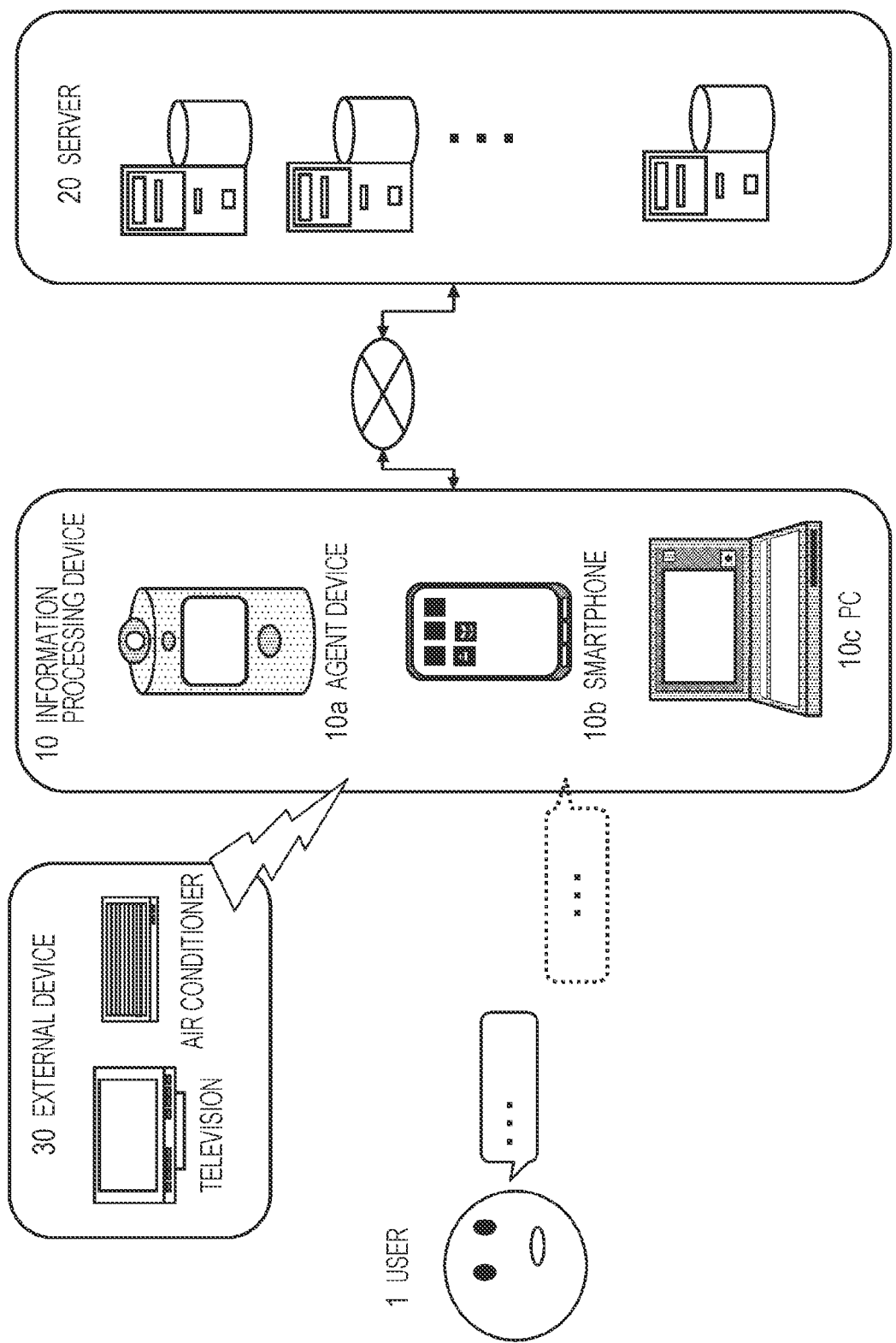
FIG. 2 is a diagram describing a configuration example and usage example of the information processing device.

As illustrated in FIG. 2, the information processing device 10 of the present disclosure is not limited to an agent device 10a, and can be in various device forms such as a smartphone 10b and a PC 10c.

The information processing device 10 recognizes the utterance of the user 1 and performs a response based on the utterance of the user, and moreover, for example, the information processing device 10 executes control of an external device 30 such as a television or an air conditioner illustrated in FIG. 2 in response to a user utterance.

For example, in a case where the user utterance is a request such as "change the TV channel to 1" or "set the temperature of the air conditioner to 20 degrees", the information processing device 10 outputs a control signal (Wi-Fi, infrared light, or the like) to the external device 30 on the basis of a voice recognition result of the user utterance, so as to execute control according to the user utterance.

Note that the information processing device 10 is connected to the server 20 via a network, and can acquire information necessary for generating a response to a user utterance from the server 20. Furthermore, as described above, the server may be configured to perform the voice recognition process or semantic analysis process.

Next, with reference to FIG. 3, an outline of processing executed by the information processing device 10 of the present disclosure will be described.

In a case where the user inputs a question-type user utterance to the information processing device 10 (system), the information processing device 10 of the present disclosure analyzes the input user utterance and performs optimum processing according to the analysis result.

Question-type utterances made by users can be broadly classified into the following three types.

(A) User utterance requesting reutterances of all system utterances (B) User utterance requesting a partial reutterance of part of system utterance (C) User utterance asking general knowledge (global question)

Furthermore, (B) can be classified into the following three types according to a method of specifying a reutterance request part.

(B1) User utterance requesting a system utterance part as a reutterance request target by specifying an utterance position of system utterance (specified position partial reutterance request)

(B2) User utterance requesting a system utterance part as a reutterance request target by specifying a temporally before-after relationship of system utterance content (specified time-series partial reutterance request)

(B3) Other user utterance requesting a partial reutterance (local question partial reutterance request)

Question-type utterances made by the user to the information processing device 10 can be classified as (A), (B1 to B3), and (C) described above.

A specific example of them will be described with reference to FIG. 3 and so on.

Figure 3:
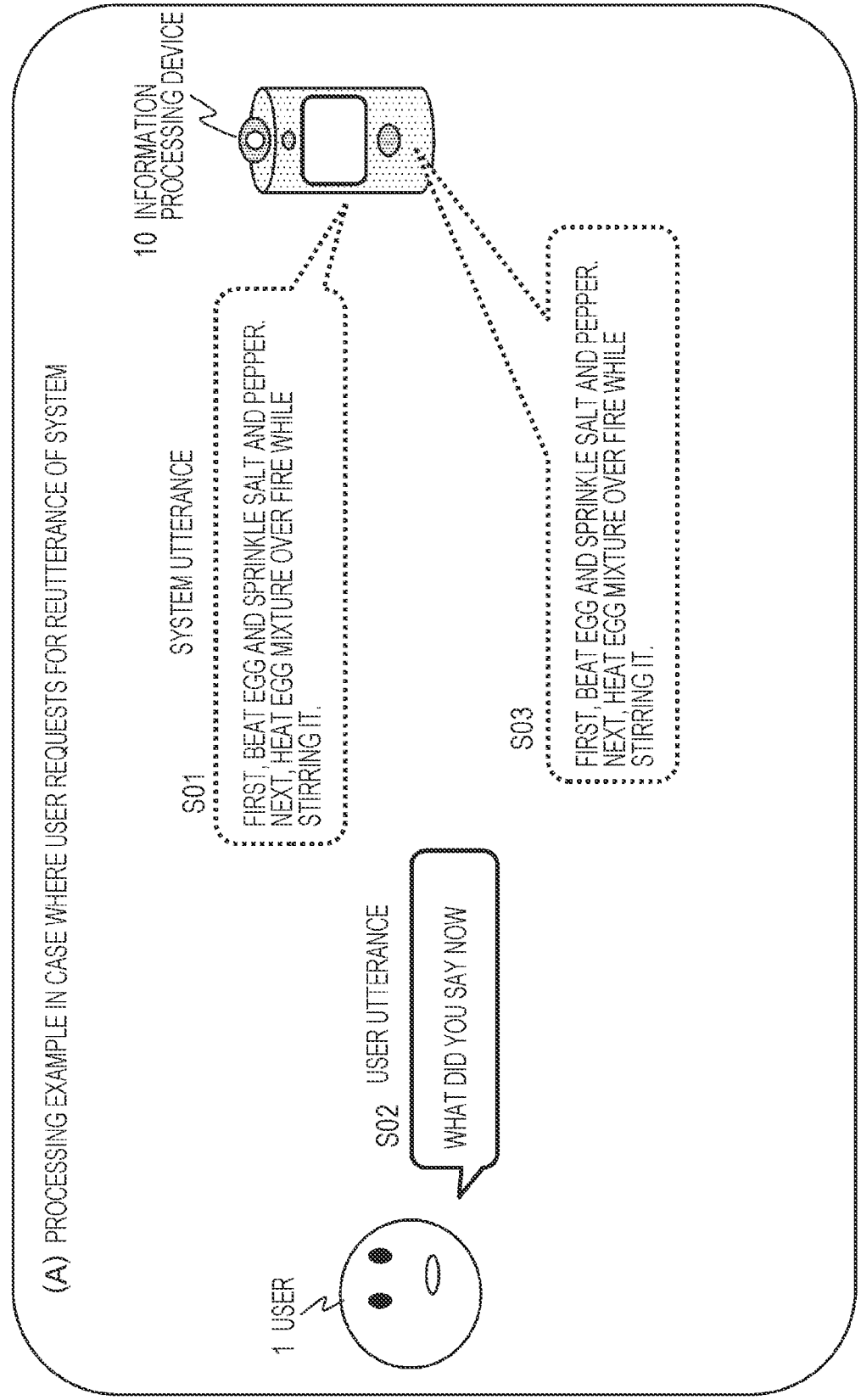
FIG. 3 is a diagram describing a specific example of processing executed by the information processing device.

In the example illustrated in FIG. 3, a specific example of type (A), that is, (A) User utterance requesting reutterances of all system utterances is illustrated.

FIG. 3 illustrates an example of dialogue between the user 1 and the information processing device 10 of the present disclosure.

First, the information processing device 10 makes the following system utterance in step S01.

System utterance=First, beat the egg and sprinkle salt and pepper. Next, heat the egg mixture over a fire while stirring it.

This system utterance is, for example, a situation in which the information processing device 10 explains recipe information acquired from a recipe information providing server to the user 1 and teaches the user cooking.

In response to this system utterance in step S01, the user 1 makes the following user utterance in step S02.

User utterance=what did you say now

The information processing device 10 that has input this user utterance performs the following system utterance as a response to the user utterance in step S03.

System utterance=First, beat the egg and sprinkle salt and pepper. Next, heat the egg mixture over a fire while stirring it.

This example illustrated in FIG. 3 is a processing example in which, the information processing device 10 determines the user utterance in step S02, that is, User utterance=What did you say now to be type (A), that is, "(A) User utterance requesting reutterances of all system utterances", and on the basis of this determination result, the entire system utterance of step S01 executed preceding the user utterance in step S02 is reuttered in step S03.

Figure 4:
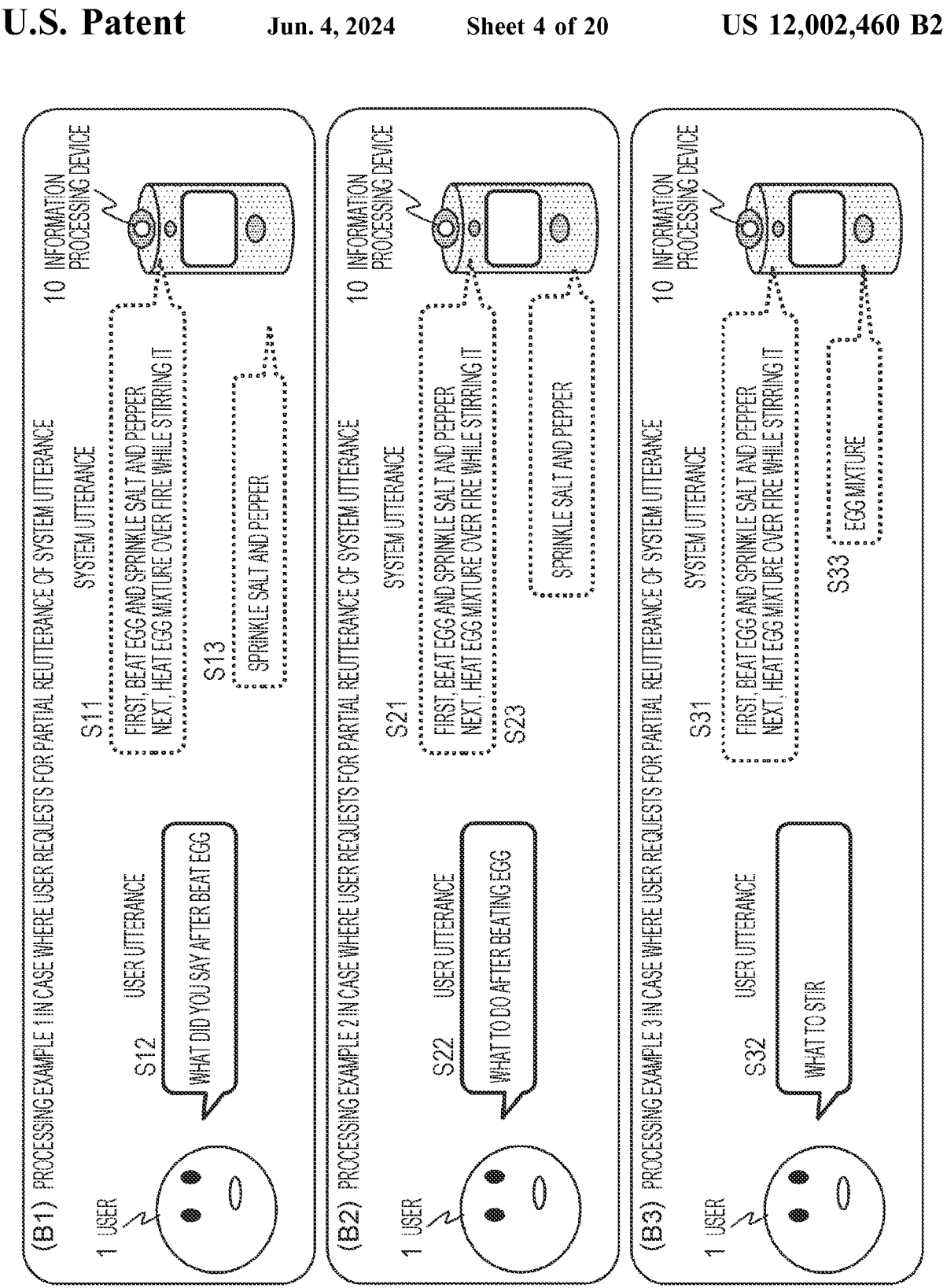
FIG. 4 is a diagram describing a specific example of processing executed by the information processing device.

In the example illustrated in FIG. 4, a specific example of type (B), that is, (B) User utterance requesting a partial reutterance of part of system utterance is illustrated.

FIG. 4 illustrates three types of examples as follows.

(B1) User utterance requesting a system utterance part as a reutterance request target by specifying an utterance position of system utterance (specified position partial reutterance request)

(B2) User utterance requesting a system utterance part as a reutterance request target by specifying a temporally before-after relationship of system utterance content (specified time-series partial reutterance request)

(B3) Other user utterance requesting a partial reutterance (local question partial reutterance request)

First, a specific example of type (B1), that is, (B1) User utterance requesting a system utterance part as a reutterance request target by specifying an utterance position of system utterance (specified position partial reutterance request)

will be described.

First, the information processing device 10 makes the following system utterance in step S11.

System utterance=First, beat the egg and sprinkle salt and pepper. Next, heat the egg mixture over a fire while stirring it.

In response to the system utterance in step S11, the user 1 makes the following user utterance in step S12.

User utterance=What did you say after beat the egg

The information processing device 10 that has input the user utterance determines that the user utterance in step S12 is of type (B), that is, "(B) User utterance requesting a partial reutterance of part of system utterance". Moreover, it is determined to be type (B1), that is, "(B1) User utterance requesting a system utterance part as a reutterance request target by specifying an utterance position of system utterance (specified position partial reutterance request)".

The information processing device 10 specifies a reutterance request part of the user from the system utterance in step S11 on the basis of a phrase (character string) included in the user utterance in step S12, on the basis of the determination result that the user utterance is of type (B1), and executes the following system utterance in step S13 using the specified system utterance part.

System utterance=Sprinkle salt and pepper

Next, a specific example of type (B2), that is, (B2) User utterance requesting a system utterance part as a reutterance request target by specifying a temporally before-after relationship of system utterance content (specified time-series partial reutterance request)

will be described.

First, the information processing device 10 makes the following system utterance in step S21.

System utterance=First, beat the egg and sprinkle salt and pepper. Next, heat the egg mixture over a fire while stirring it.

In response to the system utterance in step S21, the user 1 makes the following user utterance in step S22.

User utterance=What to do after beating the egg

The information processing device 10 that has input the user utterance determines that the user utterance in step S22 is of type (B), that is, "(B) User utterance requesting a partial reutterance of part of system utterance". Moreover, it is determined as type (B2), that is, "(B2) User utterance requesting a system utterance part as a reutterance request target by specifying a temporally before-after relationship of system utterance content (specified time-series partial reutterance request)".

The information processing device 10 specifies a reutterance request part of the user from the system utterance in step S21 on the basis of time specification information included in the user utterance in step S22, on the basis of the determination result that the user utterance is of type (B2), and executes the following system utterance in step S23 using the specified system utterance part.

System utterance=Sprinkle salt and pepper.

Next, type (B3), that is, (B3) Other user utterance requesting a partial reutterance (local question partial reutterance request)

this type (B3) is a user utterance that does not include an utterance position specification like type (B1) or a time series specification like type (B2), but demands a reutterance of part of phrases that have already been uttered in the previous system utterance.

A specific example of this type (B3) will be described.

First, the information processing device 10 makes the following system utterance in step S31.

System utterance=First, beat the egg and sprinkle salt and pepper. Next, heat the egg mixture over a fire while stirring it.

In response to the system utterance in step S31, the user 1 makes the following user utterance in step S32.

User utterance=What to stir

The information processing device 10 that has input the user utterance determines that the user utterance in step S32 is of type (B), that is, "(B) User utterance requesting a partial reutterance of part of system utterance". Moreover, it is determined to be of type (B3), that is, "(B3) Other user utterance requesting a partial reutterance (local question partial reutterance request)".

The information processing device 10 specifies a reutterance request part of the user from the system utterance in step S31 on the basis of analysis information of the user utterance in step S32, on the basis of the determination result that the user utterance is of type (B3), and executes the following system utterance in step S33 using the specified system utterance part.

System utterance=The egg mixture

Figure 5:
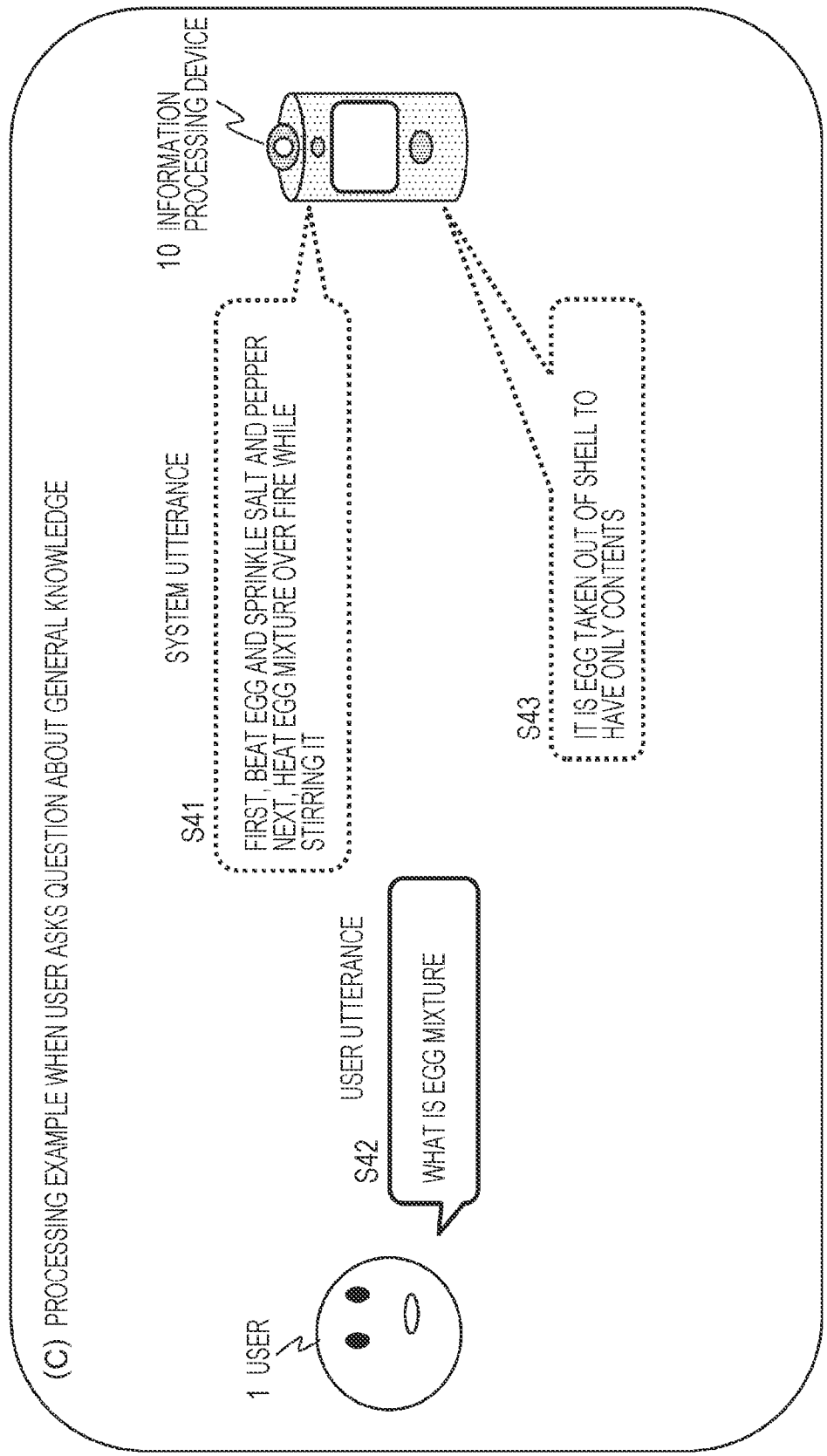
FIG. 5 is a diagram describing a specific example of processing executed by the information processing device.

Next, with reference to FIG. 5, a specific example of type (C), that is (C) User utterance asking general knowledge (global question)

will be described.

First, the information processing device 10 makes the following system utterance in step S41.

System utterance=First, beat the egg and sprinkle salt and pepper. Next, heat the egg mixture over a fire while stirring it.

In response to the system utterance in step S41, the user 1 makes the following user utterance in step S42.

User utterance=What is egg mixture

The information processing device 10 that has input the user utterance determines that the user utterance in step S42 is of type (C), that is, "(C) User utterance asking general knowledge (global question)". The information processing device 10 executes the following system utterance in step S43 on the basis of the determination result that the user utterance is of type (C).

System utterance=It is egg taken out of the shell to have only the contents

As described with reference to FIGS. 3 to 5, the information processing device 10 of the present disclosure analyzes a question-type user utterance from the user and determines which of the following types the user utterance is.

(A) User utterance requesting reutterances of all system utterances (B) User utterance requesting a partial reutterance of part of system utterance (C) User utterance asking general knowledge (global question)

Further, type (B) is classified into the following types.

(B1) User utterance requesting a system utterance part as a reutterance request target by specifying an utterance position of system utterance (specified position partial reutterance request)

(B2) User utterance requesting a system utterance part as a reutterance request target by specifying a temporally before-after relationship of system utterance content (specified time-series partial reutterance request)

(B3) Other user utterance requesting a partial reutterance (local question partial reutterance request)

The information processing device 10 generates and outputs the optimum system response required by the user on the basis of these classification results.

[2. Configuration Example of Information Processing Device]

Next, a specific configuration example of the information processing device 10 will be described with reference to FIG. 6.

Note that specific processing of each component will be described in detail later.

Figure 6:
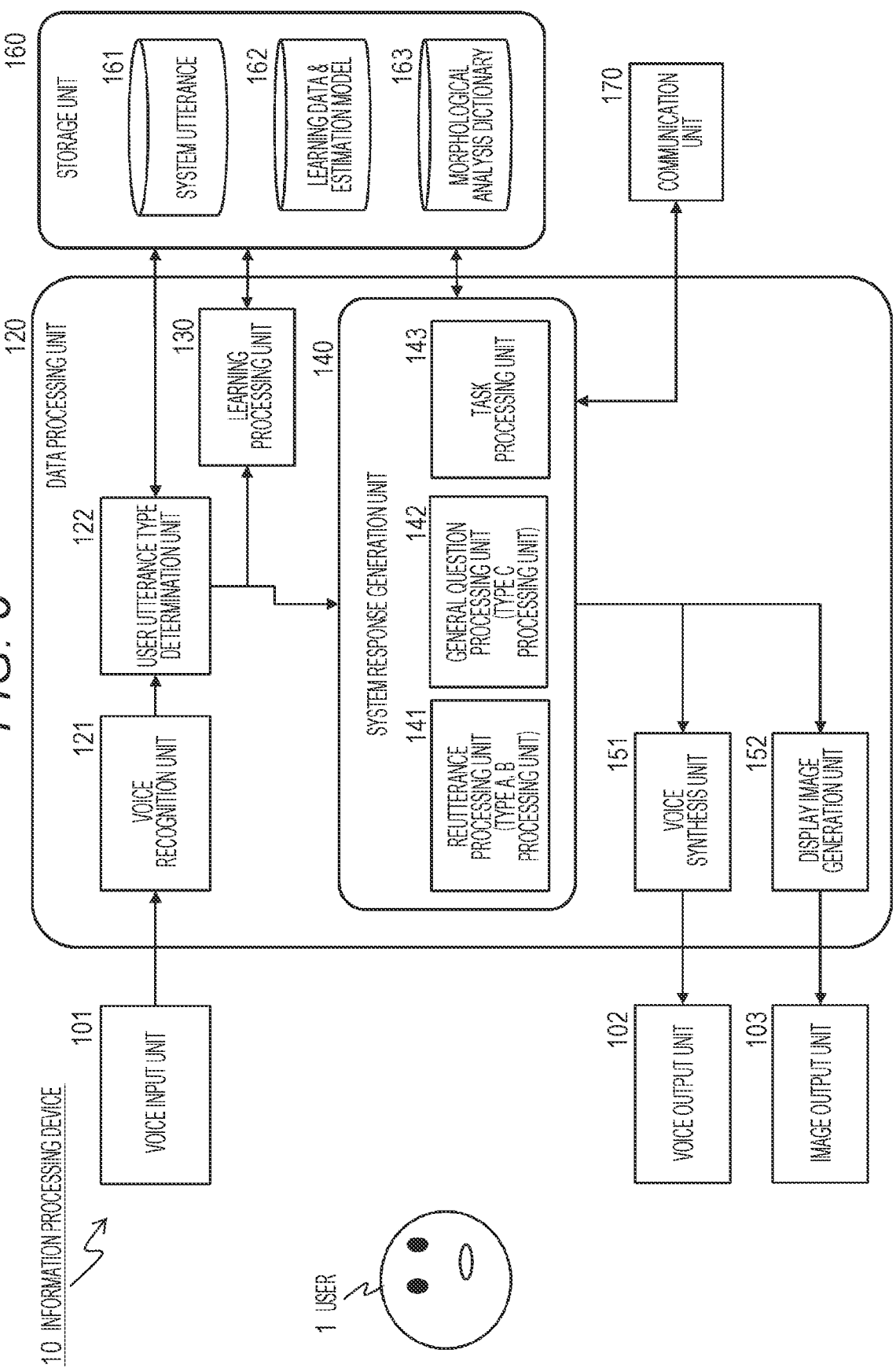
FIG. 6 is a diagram describing a specific configuration example of the information processing device.

FIG. 6 is a diagram illustrating one configuration example of the information processing device 10 that recognizes a user utterance and performs processing and a response corresponding to the user utterance.

As illustrated in FIG. 6, the information processing device 10 includes a voice input unit 101, a voice output unit 102, an image output unit 103, a data processing unit 120, a storage unit 160, and a communication unit 170.

Note that although the data processing unit 120 and the storage unit 160 can be configured in the information processing device 10, a data processing unit of an external server may be used instead of being configured in the information processing device 10. In a case of a configuration using a server, the information processing device 10 transmits input data input from the voice input unit 101 to a server via the network, receives a processing result of the data processing unit 120 of the server, and outputs the processing result via the output unit (voice output unit 102, image output unit 103).

Next, components of the information processing device 10 illustrated in FIG. 6 will be described.

The voice input unit 101 is, for example, a microphone, and corresponds to the microphone 12 of the information processing device 10 illustrated in FIG. 1.

The voice output unit 102 corresponds to the speaker 14 of the information processing device 10 illustrated in FIG. 1.

The image output unit 103 corresponds to the display unit 13 of the information processing device 10 illustrated in FIG. 1.

Note that the image output unit 103 can be configured by, for example, a projector or the like, or can be configured by using a display unit of a television as an external device.

As described above, the data processing unit 120 is configured in either the information processing device 10 or a server capable of communicating with the information processing device 10.

The data processing unit 120 has a voice recognition unit 121, a user utterance type determination unit 122, a learning processing unit 130, a system response generation unit 140, a voice synthesis unit 151, and a display image generation unit 152.

The system response generation unit 140 has a reutterance processing unit (type A, B processing unit) 141, a general question processing unit (type C processing unit) 142, and a task processing unit 143.

Furthermore, the storage unit 160 stores a system utterance 161, a learning data & estimation model 162, a morphological analysis dictionary 163, and the like. Note that the morphological analysis dictionary 163 may be configured to use, for example, existing open source software, and in this case, it is not necessary to have a unique morphological analysis dictionary in the device.

Note that, in addition to these data, the storage unit 160 stores programs applied to execution of processing in the data processing unit, and various data such as parameters used for processing, schedule information registered in advance by the user, information downloaded in advance from an external server, and the like.

An utterance voice of the user is input to the voice input unit 101 such as a microphone.

The voice input unit (microphone) 101 inputs an input user utterance voice to the voice recognition unit 121 of the data processing unit 120.

The voice recognition unit 121 has, for example, an automatic speech recognition (ASR) function, and converts voice data into text data including a plurality of words.

A voice recognition result corresponding to the user utterance generated by the voice recognition unit 121 is input to the user utterance type determination unit 122.

The user utterance type determination unit 122 inputs text data of a user utterance and a system utterance executed by the information processing device 10 immediately before the user utterance, and determines the utterance type of the user utterance on the basis of these utterance sets.

Note that the system utterance executed by the information processing device 10 immediately before the user utterance is recorded as the system utterance 161 in the storage unit 160.

The user utterance type determination unit 122 determines which of the following types of utterances the user utterance is.

(A) User utterance requesting reutterances of all system utterances (B1) User utterance requesting a system utterance part as a reutterance request target by specifying an utterance position of system utterance (specified position partial reutterance request)

(B2) User utterance requesting a system utterance part as a reutterance request target by specifying a temporally before-after relationship of system utterance content (specified time-series partial reutterance request)

(B3) Other user utterance requesting a partial reutterance (local question partial reutterance request)

(C) User utterance asking general knowledge (global question)

Note that the user utterance type determination unit 122 determines the utterance type of the user utterance using a type estimation model generated by a learning process executed in advance by the learning processing unit 130. The type estimation model is stored as a type estimation model in the learning data & estimation model 162 in the storage unit 160.

Determination information of the user utterance type determination unit 122 is input to the system response generation unit 140.

The system response generation unit 140 has a reutterance processing unit (type A, B processing unit) 141, a general question processing unit (type C processing unit) 142, and a task processing unit 143.

In a case where a determination result of the user utterance type in the user utterance type determination unit 122 is either type A or B, the reutterance processing unit (type A, B processing unit) 141 generates a system utterance as a response to the user utterance.

Furthermore, in a case where the determination result of the user utterance type in the user utterance type determination unit 122 is type C, the general question processing unit (type C processing unit) 142 generates a system utterance as a response to the user utterance.

Moreover, in a case where the determination result of the user utterance type in the user utterance type determination unit 122 is none of A to C, the task processing unit 143 executes a task as a response to the user utterance and generates a system utterance.

The system response generation unit 140 generates a system response according to the user utterance type.

The system response includes at least either voice or image.

The voice synthesis unit 151 generates voice data based on voice information included in the response generated by the system response generation unit 140, and the generated response voice data is output via the voice output unit 102 such as a speaker.

The display image generation unit 152 generates image data based on image information included in the response generated by the system response generation unit 140, and outputs the image data via the image output unit 103 such as the display unit.

The display image generation unit 152 displays text information of the system utterance to the user and other presentation information.

For example, in a case where the user makes a user utterance to say show the world map, a world map is displayed.

The world map can be obtained from, for example, a service providing server.

Note that the information processing device 10 also has a task processing execution function for user utterances.

For example, in a case of utterances such as

User utterance=Play music

User utterance=Show an interesting video the information processing device 10 performs processing for the user utterance, that is, execution processing of tasks such as music reproduction processing and moving image reproduction processing.

This task processing can be executed, for example, as a process in which the task processing unit 143 of the system utterance generation unit 140 outputs information acquired from an external server via the communication unit 170. For example, there is a process in which the task processing unit 143 outputs music information acquired from a music providing server, or the like.

[3. Overall sequence of processes executed by information processing device]

Next, an overall sequence of processes executed by the information processing device 10 will be described with reference to a flowchart illustrated in FIG. 7.

Figure 7:
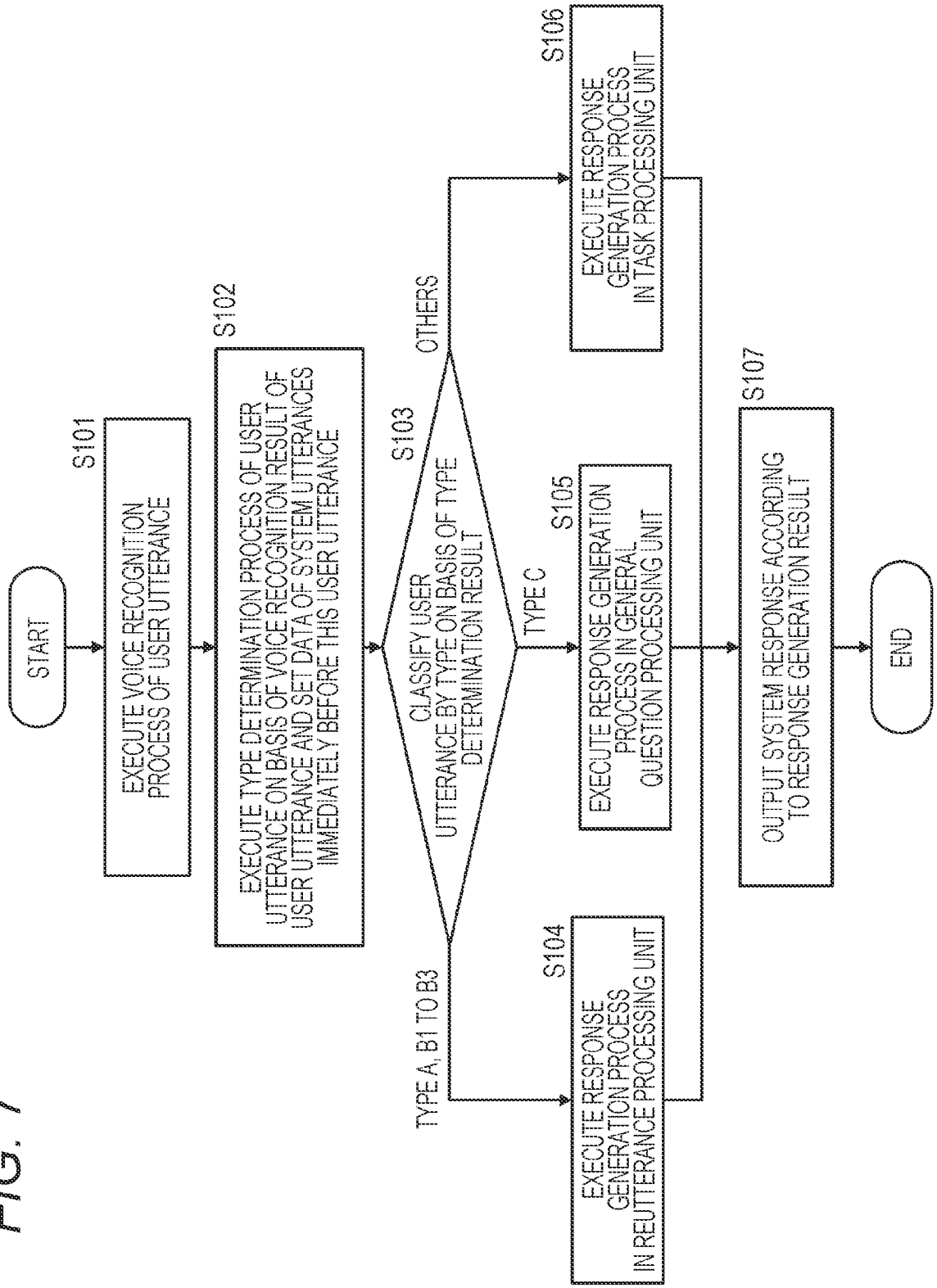
FIG. 7 is a diagram illustrating a flowchart describing a sequence of processes executed by the information processing device.

FIG. 7 is a flowchart describing the overall sequence of processes executed by the information processing device 10 illustrated in FIG. 6. Note that the processes according to the flowcharts illustrated in FIG. 7 and so on can be executed, for example, according to a program stored in the storage unit of the information processing device 10. For example, they can be executed as a program execution process by a processor such as a CPU having a program execution function.

Hereinafter, processes of respective steps of flows illustrated in FIG. 7 will be described in order.

(Step S101)

First, the information processing device 10 executes a voice recognition process of the input user utterance in step S101.

This process is a process executed by the voice recognition unit 121 of the information processing device 10 illustrated in FIG. 6.

The voice recognition unit 121 converts voice data into text data including a plurality of words by using, for example, the ASR (Automatic Speech Recognition) function.

A voice recognition result corresponding to the user utterance generated by the voice recognition unit 121 is input to the user utterance type determination unit 122.

(Steps S102 to S103)

Next, in steps S102 to S103, the utterance type of the user utterance is determined on the basis of text data of the user utterance and a set of utterances of system utterances executed by the information processing device 10 immediately before the user utterance.

This process is a process executed by the user utterance type determination unit 122 of the data processing unit 120 illustrated in FIG. 6.

The user utterance type determination unit 122 determines which of the following types of utterances the user utterance is.

(A) User utterance requesting reutterances of all system utterances (B1) User utterance requesting a system utterance part as a reutterance request target by specifying an utterance position of system utterance (specified position partial reutterance request)

(B2) User utterance requesting a system utterance part as a reutterance request target by specifying a temporally before-after relationship of system utterance content (specified time-series partial reutterance request)

(B3) Other user utterance requesting a partial reutterance (local question partial reutterance request)

(C) User utterance asking general knowledge (global question)

(Other) Other user utterances not included in A to C above (task execution request)

Determination information of the user utterance type determination unit 122 is input to the system response generation unit 140.

Note that, as described above, the user utterance type determination unit 122 determines the utterance type of the user utterance using the type estimation model generated by the learning process executed in advance by the learning processing unit 130.

(Steps S104 to S106)

The processes of steps S104 to S106 are generation processes for a system response to the user utterance for which the type determination has been executed.

This process is a process executed by the system response generation unit 140 of the data processing unit 120 illustrated in FIG. 6.

The system response generation unit 140 generates a system response according to the user utterance type.

In a case where the determination result of the user utterance type in steps S102 to S103 is one of types A and B, in step S104, the reutterance processing unit (type A, B processing unit) 141 generates a system utterance as a response to the user utterance.

Furthermore, in a case where the determination result of the user utterance type is type C, in step S105, the general question processing unit (type C processing unit) 142 generates the system utterance as a response to the user utterance.

Furthermore, in a case where the determination result of the user utterance type is none of A to C, the task processing unit 143 generates a system utterance as a response to the user utterance in step S106.

(Step S107)

Finally, at least either a system response voice or an image to be output from the information processing device 10 is generated and output on the basis of the system response generated by a system response generation process in one of steps S104 to S106.

This process is a process executed by the voice synthesis unit 151 and the display image generation unit 152 illustrated in FIG. 6.

The voice synthesis unit 151 generates voice data based on voice information included in the response generated by the system response generation unit 140, and the generated response voice data is output via the voice output unit 102 such as a speaker.

The display image generation unit 152 generates image data based on image information included in the response generated by the system response generation unit 140, and outputs the image data via the image output unit 103 such as the display unit.

The display image generation unit 152 displays text information of the system utterance to the user and other presentation information.

[4. User Utterance Type Determination Process Executed by User Utterance Type Determination Unit]

Next, a user utterance type determination process executed by the user utterance type determination unit 122 will be described.

As described above, the user utterance type determination unit 122 inputs text data of a user utterance and a system utterance executed by the information processing device 10 immediately before the user utterance, and determines the utterance type of the user utterance by using the type estimation model.

The user utterance type determination unit 122 determines which of the following types of utterances the user utterance is.

(A) User utterance requesting reutterances of all system utterances (B1) User utterance requesting a system utterance part as a reutterance request target by specifying an utterance position of system utterance (specified position partial reutterance request)

(B2) User utterance requesting a system utterance part as a reutterance request target by specifying a temporally before-after relationship of system utterance content (specified time-series partial reutterance request)

(B3) Other user utterance requesting a partial reutterance (local question partial reutterance request)

(C) User utterance asking general knowledge (global question)

Hereinafter, the user utterance type determination process executed by the user utterance type determination unit 122 will be described on the basis of a specific example.

The information processing device 10 acquires a system utterance executed immediately before a user utterance to be an utterance type analysis target from the storage unit 160, and performs the type determination process using the acquired system utterance and group data of the user utterance thereafter.

Input data of the user utterance type determination unit 122 is a user utterance to be an utterance type analysis target and a system utterance executed immediately before the user utterance, and output data is utterance type information.

An example of input and output data will be described below.

(1) Input Data

System utterance="Apples produced in Nagano Prefecture are called Shinshu apples"

User utterance="Where are the apples produced"

(2) Output Data

Utterance type=B3

Note that the utterance type (B3) is the following type.

(B3) Other user utterance requesting a partial reutterance

In this manner, the user utterance type determination unit 122 inputs the user utterance to be an utterance type analysis target and the system utterance executed immediately before the user utterance, analyzes the group of these utterances, and determines if the user utterance is of any of types (A) to (C) or another.

Note that the user utterance type determination unit 122 determines the utterance type of the user utterance using the type estimation model generated by the learning processing unit 130 by the learning process in advance. The type estimation model generated by the learning process is stored as a type estimation model in the learning data & estimation model 162 of the storage unit 160.

FIG. 8 is a diagram describing an example of data included in the learning data & estimation model 162 stored in the storage unit 160.

As illustrated in FIG. 8, the learning data & estimation model 162 includes type estimation learning data 162a and a type estimation model [data in which utterance types (labels) and feature amounts are statistically associated] 162b.

The type estimation learning data 162a is data used for a learning process executed by the learning processing unit 130. By performing the learning process using this type estimation learning data 162*a*, the type estimation model [data in which utterance types (labels) and feature amounts are statistically associated] 162*b* is generated and updated.

FIG. 9 illustrates a data example of the type estimation learning data 162*a*.

As illustrated in FIG. 9, the type estimation learning data 162*a* includes corresponding data as follows.

(A) System utterance immediately before user utterance
(B) User utterance
(C) Label (=utterance type (A, B1, B2, B3, C))

As these data, learning data prepared in advance may be used, or data newly generated on the basis of a dialogue between the information processing device 10 and the user 1 may be used.

As the learning data prepared in advance, for example, utterance group data of typical system utterance and user utterances and data in which utterance types (A, B1, B2, B3, C) of user utterances of the utterance group data are set as labels can be used.

Note that the learning processing unit 130 continuously executes the learning process by using new dialogue data between the information processing device 10 and the user 1 and the label (user utterance type) set by the user utterance type determination unit 122 on the basis of the data thereof, and executes update of the type estimation model 162*b* stored in the storage unit 160 on the basis of a learning process result.

The learning processing unit 130 executes the learning process using, for example, the type estimation learning data 162*a* having a data configuration as illustrated in FIG. 9, and the type estimation model [data in which utterance types (labels) and feature amounts are statistically associated] 162*b* is generated and updated.

A sequence of the learning process using the type estimation learning data 162*a* having the data configuration illustrated in FIG. 9 will be described with reference to a flowchart illustrated in FIG. 10.

Hereinafter, processes of respective steps of the flow illustrated in FIG. 10 will be described in order.

(Step S121)

First, the type estimation learning data 162*a* of the storage unit 160 is input. That is, a user utterance, a system utterance immediately before the user utterance, a label indicating an utterance type (A, B1, B2, B3, C) of the user utterance, and data thereof are input.

(Step S122)

Next, on the basis of the data input in step S121, feature amounts of the user utterance and the system utterance immediately before are extracted. The feature amounts to be extracted are, for example, the following feature amounts.

(1) Character N-gram included in voice recognition text of user utterance and system utterance immediately before
(2) N-gram of words and parts of speech included in voice recognition text of user utterance and system utterance immediately before
(3) Prosodic information of utterance voice of user (intonation of rising or falling tone, or the like)

(Step S123)

Next, in step S123, generation and update of a label (=user utterance type) estimation model based on the feature amount extracted in step S122 are performed.

As a result of this processing, the generation process and the update process of the type estimation model [data in which utterance types (labels) and feature amounts are statistically associated] 162*b* stored in the storage unit 160 are executed.

Note that upon extracting the feature amount in step S122, it is necessary to analyze words included in a text of a user utterance or a system utterance and their parts of speech, and this process can be executed by a morphological analysis process.

Furthermore, various algorithms can be used as a machine learning algorithm executed by the learning processing unit 130. For example, a support vector machine (SVM), logistic regression, or the like can be used.

Furthermore, although prosodic information (whether it is intonation of rising or falling tone, or the like) of utterance voice of the user is described as the feature amount extracted in step S122, this feature amount does not necessarily have to be used.

However, it is an effective feature amount in a case where it is used supplementary as a feature to express question-likeness that is difficult to distinguish from the text alone.

For example, user utterance="Where are the apples produced"

When looking at the text of the user utterance, it is not possible to understand whether it is a question, but if the intonation is rising, it can be considered highly likely to be a question.

Furthermore, it may be configured such that the system utterance immediately before the user utterance is not used as an extraction target of feature amount.

However, by analyzing word duplication between user utterances and system utterances, the following two types can be discriminated.

Utterance type (C) User utterance asking general knowledge (global question)
Utterance type (B3) Other user utterance requesting a partial reutterance (local question partial reutterance request)
A case of determining the user utterance type based on the following system utterance and user utterance will be described.
System utterance=Apples produced in Nagano prefecture are called Shinshu apples
User utterance=Where are the apples produced The user utterance type is determined based on the system utterance and user utterance described above.

Separate each utterance by other words.

User utterance "where/are/the/apples/produced" ("/" is an example of word boundaries)

This user utterance contains many words contained in the system utterance immediately before "Apples/produced/in/Nagano/prefecture/are/called/Shinshu/apples" (three out of five words, or two out of three words when counted excluding particles).

In a case where many of words contained in the user utterance overlap with words contained in the system utterance immediately before, it can be determined that it is highly possible that the user utterance requests for reutterance of the system utterance content, that is, the type "(B3) Other user utterance requesting a partial reutterance (local question partial reutterance request)".

Furthermore, the feature amount extracted in step S122 is not limited to the above-described example. For example, a difference (elapsed time) between the output time of the system utterance immediately before the user utterance and the input time of the user utterance may be added as a feature amount.

Figure 10:
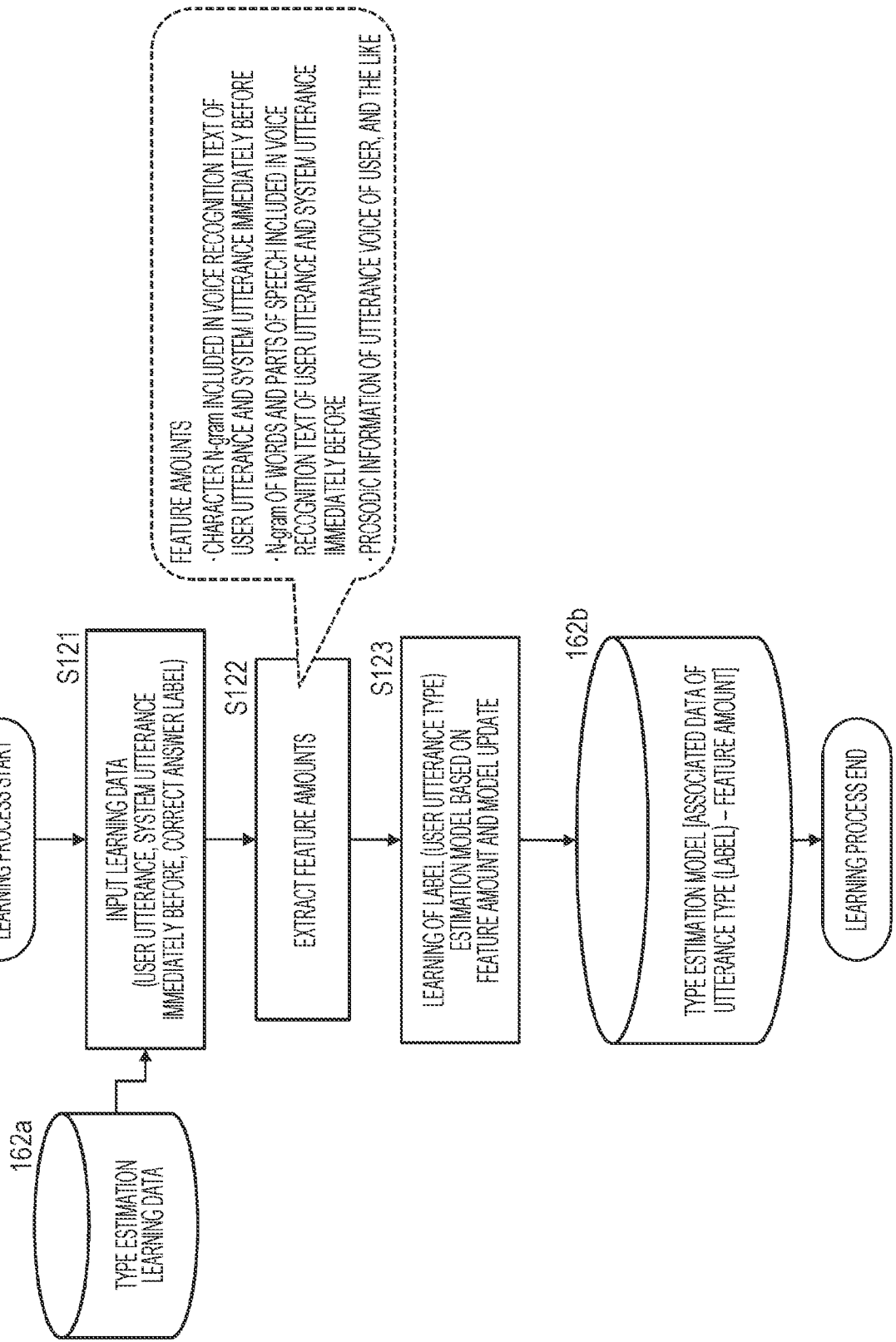
FIG. 10 is a diagram illustrating a flowchart describing a sequence of a learning process.

Note that the feature amount is a feature amount extracted in the learning process executed according to the flow illustrated in FIG. 10, and there are the following feature amounts.

(1) Character N-gram included in voice recognition text of user utterance and system utterance immediately before
(2) N-gram of words and parts of speech included in voice recognition text of user utterance and system utterance immediately before
(3) Prosodic information of utterance voice of user (intonation of rising or falling tone, or the like)

That is, for example, if a specific feature amount can be obtained from a set of system utterance and user utterance, a label (=utterance type) can be estimated from the feature amount.

The type estimation model [data in which utterance types (labels) and feature amounts are statistically associated] 162b is a model that enables this estimation.

In a case where a new combination of system utterance and user utterance is input, the user utterance type determination unit 122 of the data processing unit 120 illustrated in FIG. 6 can estimate the type of a user utterance using this model.

Note that the learning process according to the flow illustrated in FIG. 10 is executed by using the data also in a case where a new combination of system utterance and user utterance is input in the learning processing unit 130, and on the basis of a result of this learning process, the type estimation model [data in which utterance types (labels) and feature amounts are statistically associated] 162b stored in the storage unit 160 is sequentially updated.

Next, a processing sequence of a user utterance type determination process executed by the user utterance type determination unit 122 of the data processing unit 120 illustrated in FIG. 6 will be described with reference to a flow illustrated in FIG. 11.

The user utterance type determination unit 122 executes the user utterance type determination process with reference to the type estimation model [data in which utterance types (labels) and feature amounts are statistically associated] 162b stored in the storage unit 160.

Processes of respective steps of the flow illustrated in FIG. 11 will be described.

(Step S141)

First, in step S141, the user utterance type determination unit 122 inputs text data of a new user utterance to be a type determination process target and a system utterance executed by the information processing device 10 immediately before the user utterance.

The text data of the new user utterance to be a type determination process target is text data generated by the voice recognition unit 121 on the basis of the user utterance. The system utterance executed by the information processing device 10 immediately before the user utterance is data recorded as the system utterance 161 in the storage unit 160.

(Step S142)

Next, in step S142, the user utterance type determination unit 122 extracts feature amounts of the user utterance and the system utterance immediately before on the basis of the data input in step S141. The feature amounts to be extracted are, for example, the following feature amounts.

(1) Character N-gram included in voice recognition text of user utterance and system utterance immediately before
(2) N-gram of words and parts of speech included in voice recognition text of user utterance and system utterance immediately before
(3) Prosodic information of utterance voice of user (intonation of rising or falling tone, or the like)

(Step S143)

Next, in step S143, the user utterance type determination unit 122 refers to the type estimation model [data in which utterance types (labels) and feature amounts are statistically associated] 162b stored in the storage unit 160, and executes the determination process of the user utterance type (A, B1, B2, B3, C) (=label) on the basis of the feature amounts extracted in step S142.

The user utterance type determination unit 122 determines the utterance type of the user utterance input in step S141 by a machine learning method using the type estimation model [data in which utterance types (labels) and feature amounts are statistically associated] 162b and the feature amounts extracted in step S142.

In this manner, the user utterance type determination unit 122 determines which utterance type (A, B1, B2, B3, C) the user utterance is executed on the basis of the feature amounts of the voice recognition text of the user utterance, and the immediately preceding system utterance, that is, the feature amounts of character N-gram, N-gram of the word and part of speech of the word, and prosodic information of user utterance voice (whether it is intonation of the up tone/down tone, or the like), and the like.

Figure 11:
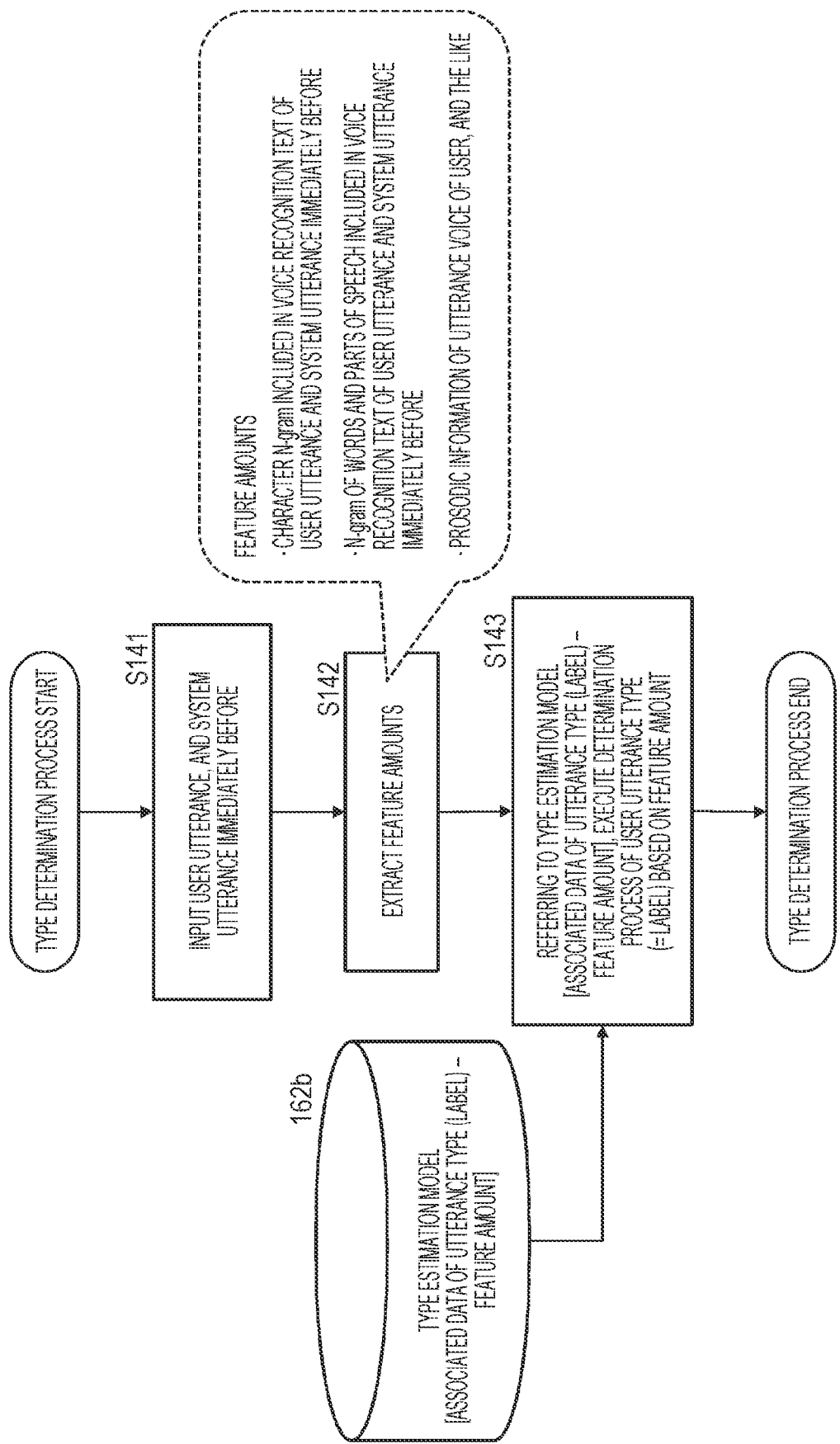
FIG. 11 is a diagram illustrating a flowchart describing a sequence of a type determination process of a user utterance executed by the information processing device.

Note that in a case where the reliability of a determination result of the utterance type of the user utterance determined by the process according to the flow illustrated in FIG. 11 is low, the information processing device 10 may return an utterance to the user 1 to check the intention of the user.

For example, a configuration may be employed in which, in a case where
  User utterance=Where are the apples produced
  this user utterance is difficult to be determined as which type of
  Type (B) User utterance requesting a partial reutterance of part of system utterance, and
  Type (C) User utterance asking general knowledge,
  a system utterance such as "do you want to know general knowledge?" or "is it a question about what I said?" for checking is performed.

[5. Processing Executed by Reutterance Processing Unit (Type a, B Processing Unit)]

Next, processing executed by the reutterance processing unit (type A, B processing unit) 141 of the response processing unit 140 of the data processing unit 120 illustrated in FIG. 6 will be described.

The reutterance processing unit (type A, B processing unit) 141 of the response processing unit 140 generates a system utterance as a response to the user utterance in a case where a determination result of the user utterance type in the user utterance type determination unit 122 is either type A or B.

That is, the reutterance processing unit (type A, B processing unit) 141 generates a system utterance as a response to the user utterance in a case where a determination result of the user utterance type is one of:

(A) User utterance requesting reutterances of all system utterances;
(B1) User utterance requesting a system utterance part as a reutterance request target by specifying an utterance position of system utterance (specified position partial reutterance request);
(B2) User utterance requesting a system utterance part as a reutterance request target by specifying a temporally before-after relationship of system utterance content (specified time-series partial reutterance request); and
(B3) Other user utterance requesting a partial reutterance (local question partial reutterance request).

An example of input-output data of the reutterance processing unit (type A, B processing unit) 141 will be described below.

(1) Input Data

System utterance immediately before user utterance="Apples produced in Nagano Prefecture are called Shinshu apples"

User utterance (voice recognition text)="Where are the apples produced"

Type determination result of user utterance type determination unit 122=B3

(2) Output Data

System utterance="It is Nagano prefecture"

The input-output data example described above is an example in a case where the type determination result=B3 of the user utterance type determination unit 122 is input.

The reutterance processing unit (type A, B processing unit) 141 of the response processing unit 140 executes different processing depending on which the user utterance type determination result in the user utterance type determination unit 122 is of the types A and B1 to B3.

Figure 12:
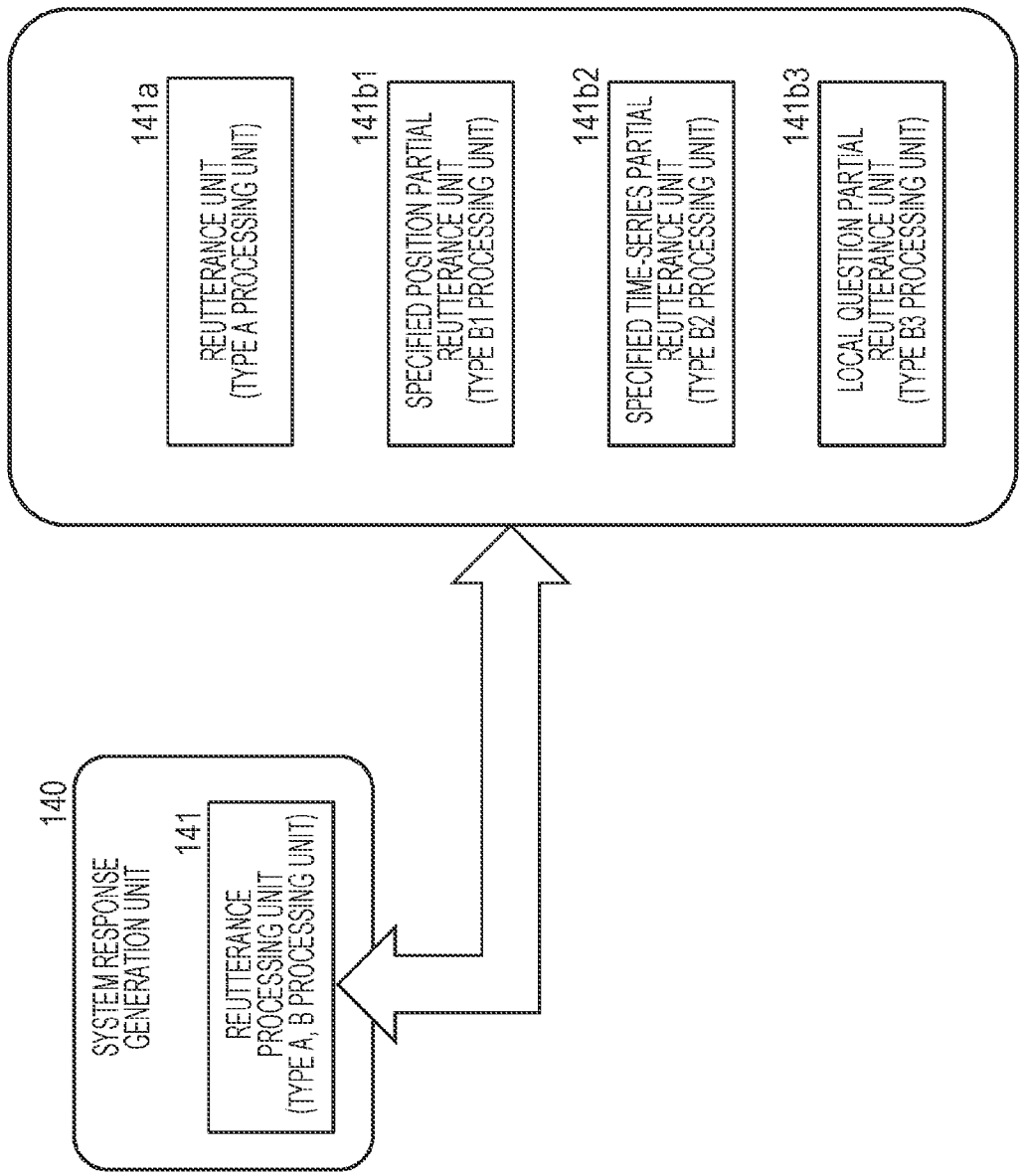
FIG. 12 is a diagram describing a configuration example of a system response generation unit of the information processing device.

As illustrated in FIG. 12, the reutterance processing unit (type A, B processing unit) 141 has four processing units that execute processing according to the types of utterance types (A, B1, B2, B3), respectively, of the user utterance.

(1) Reutterance unit (type A processing unit) 141*a* that generates a system utterance (response) in a case where the utterance type of the user utterance is type A (2) Specified position partial reutterance unit (type B1 processing unit) 141*b*1 that generates a system utterance (response) in a case where the utterance type of the user utterance is type B1

(3) Specified time-series partial reutterance unit (type B2 processing unit) 141*b*2 that generates a system utterance (response) in a case where the utterance type of the user utterance is type B2

(4) Local question partial reutterance unit (type B3 processing unit) 141*b*3 that generates a system utterance (response) in a case where the utterance type of the user utterance is type B3

Hereinafter, processing examples of each of these processing units will be described.

[5-1. Processing Executed by Reutterance Unit (Type a Processing Unit) that Generates System Utterance (Response) in Case where Utterance Type of User Utterance is Type A]

First, processing by the reutterance unit (type A processing unit) 141*a* that generates a system utterance (response) in a case where the utterance type of the user utterance is type A will be described.

In the user utterance type determination unit 122, in a case where the user utterance is of utterance type A, that is, (A) User utterance requesting reutterances of all system utterances in a case where the user utterance is determined to be of type A described above, the reutterance unit (type A processing unit) 141*a* that generates a system utterance (response) generates all system utterances executed immediately before the user utterance as reutterance data.

An example of input-output data of the reutterance unit (type A processing unit) 141*a* will be described below as an example of processing executed by the reutterance unit (type A processing unit) 141*a*.

(1) Input Data

The input data is a system utterance immediately before the user utterance. For example, it is the following system utterance.

System utterance="Apples produced in Nagano Prefecture are called Shinshu apples"

Note that this input data is acquired from the system utterance 161 stored in the storage unit 160.

(2) Output Data

The reutterance unit (type A processing unit) 141*a* uses the input data described above as output data as it is. That is, the following system utterance is used as output data.

System utterance="Apples produced in Nagano Prefecture are called Shinshu apples"

As described above, in a case where the user utterance is of type A, the reutterance unit (type A processing unit) 141*a* generates all system utterances executed immediately before the user utterance as reutterance data.

[5-2. Processing executed by specified position partial reutterance unit (type B1 processing unit) that generates system utterance (response) in case where utterance type of user utterance is type B1]

Next, processing executed by the specified position partial reutterance unit (type B1 processing unit) 141*b*1 that generates the system utterance (response) in a case where the utterance type of the user utterance is type B1 will be described.

In the user utterance type determination unit 122, in a case where the user utterance is of utterance type B1, that is, (B1) User utterance specifying a position of a system utterance part as a reutterance request target using a phrase included in system utterance (specified position partial reutterance request)

in a case where the user utterance is determined to be of type B1 described above, the specified position partial reutterance unit (type B1 processing unit) 141*b*1 generates a system response.

The specified position partial reutterance unit (type B1 processing unit) 141*b*1 that generates a system utterance (response) specifies a reutterance execution part according to a phrase included in the user utterance from the system utterance executed immediately before the user utterance, and generates system reutterance data by selecting the specified reutterance execution part.

An example of input-output data of the specified position partial reutterance unit (type B1 processing unit) 141*b*1 will be described below as an example of processing executed by the specified position partial reutterance unit (type B1 processing unit) 141*b*1.

Processing Example 1

(1a) Input Data

The input data are a system utterance immediately before a user utterance and the user utterance. For example, it is the following system utterance and user utterance.

System utterance=Beat the egg and sprinkle salt and pepper

User utterance=What did you say after beat the egg

In these pieces of data, the system utterance is acquired from the storage unit 160, and the user utterance is acquired from the voice recognition unit 121.

(1b) Output Data

On the basis of the input data described above, the specified position partial reutterance unit (type B1 processing unit) 141*b*1 specifies a reutterance execution part according to a phrase included in the user utterance, selects the specified reutterance execution part, and generates system reutterance data. For example, the following system utterance is generated as output data.

System utterance=Sprinkle salt and pepper

Another processing example executed by the specified position partial reutterance unit (type B1 processing unit) 141b1 will be described below.

Processing Example 2

(2a) Input Data

System utterance=Beat the egg and sprinkle salt and pepper

User utterance=What did you say before sprinkling salt and pepper (2b) Output data On the basis of the input data described above, the specified position partial reutterance unit (type B1 processing unit) 141b1 specifies a reutterance execution part according to a phrase included in the user utterance, selects the specified reutterance execution part, and generates system reutterance data. For example, the following system utterance is generated as output data.

System utterance=Beat the egg

The specified position partial reutterance unit (type B1 processing unit) 141b1 extracts a phrase indicating the start position or end position of the partial reutterance to be selected from the system utterance from a voice recognition text of the user utterance.

In the case of the above-described (Processing example 1), User utterance=What did you say after beat the egg The "beat the egg" in this user utterance corresponds to the phrase indicating the start position of a partial reutterance to be selected from the system utterance.

Furthermore, in the case of (Processing example 2),

User utterance=What did you say before sprinkle salt and pepper

The "sprinkle salt and pepper" in this user utterance corresponds to the phrase indicating the end position of a partial reutterance to be selected from the system utterance.

Next, the specified position partial reutterance unit (type B1 processing unit) 141b1 executes one of the following processes.

(1) In a case where the phrase extracted from the voice recognition text of the user utterance is a phrase indicating the start position of the partial reutterance to be selected from the system utterance, a character string of a part after the same phrase as the selected phrase in the system utterance is extracted.

(2) In a case where the phrase extracted from the voice recognition text of the user utterance is a phrase indicating the end position of the partial reutterance to be selected from the system utterance, a character string of a part before the same phrase as the selected phrase in the system utterance is extracted.

In the case of (Processing example 1) described above, the "beat the egg" is a phrase indicating the start position of the partial reutterance.

In this case, the substring "sprinkle salt and pepper" after the "beat the egg" in the system utterance is extracted, and a system response based on this extracted data is generated and output.

On the other hand, in the case of (Processing example 2), the "sprinkle salt and pepper" is a phrase indicating the end position of the partial reutterance.

In this case, the substring "beat the egg" before the system utterance "sprinkle salt and pepper" is extracted, and a system response based on this extracted data is generated and output.

Figure 13:
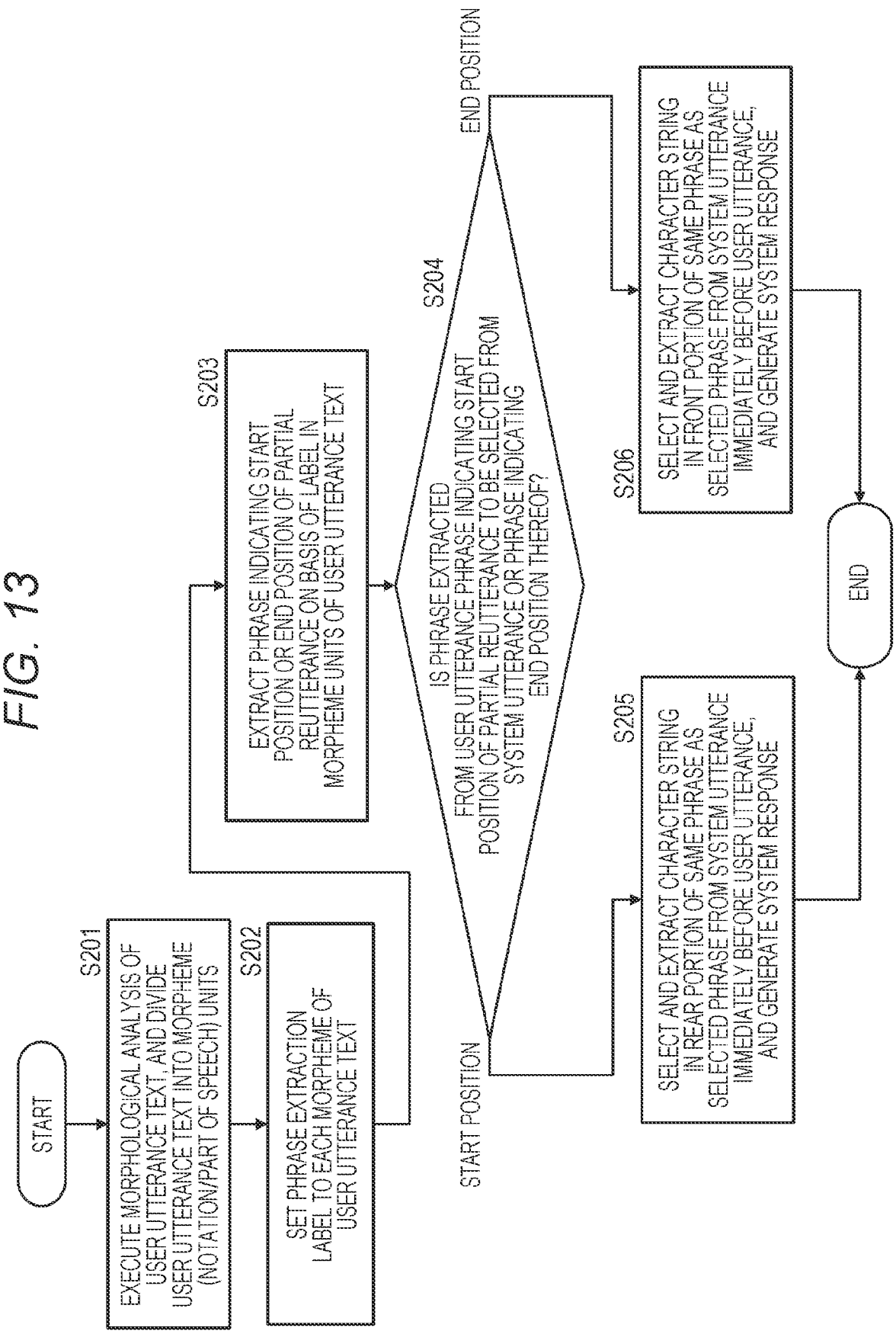
FIG. 13 is a diagram illustrating a flowchart describing a processing sequence executed by a specified position partial reutterance unit of the information processing device.

FIG. 13 is a flowchart describing a processing sequence executed by the specified position partial reutterance unit (type B1 processing unit) 141b1.

Hereinafter, processes of respective steps of the flow illustrated in FIG. 13 will be described in order.

(Step S201)

First, the specified position partial reutterance unit (type B1 processing unit) 141b1 executes a morphological analysis of a user utterance text to be analyzed input from the voice recognition unit 121 in step S201, and divides the user utterance text into morpheme (notation/part of speech) units.

(Step S202)

Next, in step S202, a phrase extraction label is set to each of morphemes of the user utterance text classified in step S201.

FIG. 14 illustrates an example of user utterance text data processed in steps S201 to S202.

FIG. 14 illustrates the following two examples.

(Example 1) User utterance=What did you say after beat the egg (Example 2) User utterance=Say again before sprinkle salt and pepper FIG. 14 illustrates results of dividing these two user utterances into morphemes (notation, part of speech) units in step S201 and setting phrase extraction labels (IOB2 tags) for each morpheme in step S202.

The example illustrated in FIG. 14 is an example in which IOB2 tags are set as phrase extraction labels.

The IOB2 tag determines whether or not each element, such as a proper noun, is included in a "chunk", which is a data unit such as a semantic group, and further, they are tags enabling to identify "B] for the beginning element of the chunk,

[I] for other than the beginning of the chunk, and

[O] for elements not included in the chunk.

Moreover, in the processing of the present disclosure, in a case where it is a chunk element constituting a phrase indicating the start position of a partial reutterance to be selected from the system utterance, the following tags

[B-START] for the beginning of the chunk, and

[I-START] for other than the beginning of the chunk element are set.

On the other hand, in a case where it is a chunk element constituting a phrase indicating the end position of the partial reutterance to be selected from the system utterance, the following tags

[B-END] for the beginning of the chunk, and

[I-END] for other than the beginning of the chunk, are set.

A result of setting this tag is an example illustrated in FIG. 14.

In (Example 1) illustrated in FIG. 14,

User utterance=What did you say after beat the egg, the "beat the egg" in this user utterance corresponds to a phrase indicating the start position of the partial reutterance to be selected from the system utterance, and the following phrase extraction label (IOB2 tag) is set in an element unit of this "beat the egg".

[B-START] for the beginning element of the chunk="egg", and

[I-START] for an element other than the beginning of the chunk="wo, beat, te"

These phrase extraction labels (IOB2 tags) are set.

Furthermore, FIG. 14 (Example 2) illustrates that

User utterance=What did you say before sprinkle salt and pepper the "sprinkle salt and pepper" in this user utterance corresponds to the phrase indicating the end position of the partial reutterance to be selected from the system utterance, and the following phrase extraction label (IOB2 tag) is set with the element unit of this "sprinkle salt and pepper".

[B-END] for the beginning element of chunk="salt", and

[I-END] for an element other than the beginning of the chunk="pepper, wo, sprinkle, masu"

These phrase extraction labels (IOB2 tags) are set.

In step S202 of the flow illustrated in FIG. 13, a phrase extraction label (tag) is set to each morpheme (notation, part of speech) of the user utterance text classified in step S201 in this manner.

Note that the phrase extraction label (tag) setting process with respect to each morpheme of the user utterance text executed in step S202 is executed using the learning data generated in advance.

Morpheme notations and part of speech can be used as feature amounts for learning. Furthermore, various algorithms such as conditional random field (CRF) and long short-term memory (LSTM) can be applied as the learning processing algorithm.

This learning process is executed by the learning processing unit 130 illustrated in FIG. 6. Note that the learning processing unit 130 performs the following two processes, (i) Learning process of phrase extraction label, and (ii) Learning process of user utterance type.

FIG. 15 is a diagram describing an example of data included in the learning data & estimation model 162 stored in the storage unit 160.

As illustrated in FIG. 15, the learning data & estimation model 162 includes a phrase extraction label (IOB2 tag) estimation learning data 162*c* and a phrase extraction label (IOB2 tag) estimation model [data that statistically associates morphemes (notation, part of speech) and labels (IOB2 tag)] 162*d*.

The phrase extraction label (IOB2 tag) estimation learning data 162*c* is data used for learning processing executed by the learning processing unit 130. By performing the learning process using this phrase extraction label (IOB2 tag) estimation learning data 162*c*, the phrase extraction label (IOB2 tag) estimation model [data that statistically associates morphemes (notation, part of speech) and labels (IOB2 tag)] 162*d* is generated and updated.

Note that this learning process can be executed in advance using the learning data prepared in advance, it is further possible to perform new learning processing by applying data generated on the basis of the new process executed in the information processing device 10, and on the basis of a learning result thereof, the phrase extraction label (IOB2 tag) estimation model [data that statistically associates morphemes (notation, part of speech) and labels (IOB2 tag)] 162*d* stored in the storage unit 160 is updated sequentially.

(Step S203)

Returning to the flow illustrated in FIG. 13, the description of the processing sequence executed by the specified position partial reutterance unit (type B1 processing unit) 141*b*1 will be continued.

In step S202, when the setting of the phrase extraction label (IOB2 tag) to each morpheme (notation, part of speech) of the user utterance text classified in step S201 is completed, a process of step S203 is executed next.

In step S203, the specified position partial reutterance unit (type B1 processing unit) 141*b*1 extracts a phrase indicating the start position or end position of the partial reutterance from the user utterance by using data generated in step S202, that is, an estimation result of the phrase extraction label (IOB2 tag) for each morpheme of the user utterance text.

In the case described with reference to FIG. 14 (Example 1), in response to this user utterance, User utterance=What did you say after beat the egg in the label (IOB2 tag) setting process for each morpheme in step S202, phrase extraction labels (IOB2 tags), Morpheme="egg", label (IOB2 tag)=[B-START], Morpheme="wo, beat, te", label (IOB2 tag)=[I-START], are set.

In step S203, according to this label setting,

Phrase="beat the egg" is extracted as a phrase indicating the start position of the partial reutterance to be selected from the system utterance.

Furthermore, in the case of (Example 2) described with reference to FIG. 14, in response to this user utterance, User utterance=What did you say before sprinkle salt and pepper in the label (IOB2 tag) setting process for each morpheme in step S202, phrase extraction labels (IOB2 tags), Morpheme="salt", label (IOB2 tag)=[B-END]

Morpheme="sprinkle, salt, and, pepper", label (IOB2 tag)=[I-END]

are set.

In step S203, according to this label setting,

Phrase="sprinkle salt and pepper" is extracted as a phrase indicating the end position of the partial reutterance to be selected from the system utterance.

(Step S204)

In step S203, when the process of extracting from the user utterance the phrase indicating the start position or end position of the partial reutterance unit to be selected from the system utterance is completed, the specified position partial reutterance unit (type B1 processing unit) 141*b*1 executes a process of step S204.

In step S204, the specified position partial reutterance unit (type B1 processing unit) 141*b*1 determines whether the phrase extracted from the user utterance extracted in step S203 is a phrase indicating the start position of the partial reutterance to be selected from the system utterance or a phrase indicating the end position thereof.

In a case where the phrase extracted from the user utterance is a phrase indicating the start position of the partial reutterance to be selected from the system utterance, the process proceeds to step S205.

On the other hand, in a case where the phrase extracted from the user utterance is a phrase indicating the end position of the partial reutterance to be selected from the system utterance, the process proceeds to step S206.

(Step S205)

In a case where it is determined in step S204 that the phrase extracted from the user utterance is a phrase indicating the start position of the partial reutterance to be selected from the system utterance, a process of step S205 is executed.

In step S205, the specified position partial reutterance unit (type B1 processing unit) 141*b*1 selects and extracts a character string in a rear portion of the same phrase as the selected phrase from the system utterance immediately before the user utterance, and generates a system response.

(Step S206)

On the other hand, in step S204, in a case where it is determined that the phrase extracted from the user utterance is a phrase indicating the end position of the partial reutterance to be selected from the system utterance, a process of step S206 is executed.

In step S206, the specified position partial reutterance unit (type B1 processing unit) 141b1 selects and extracts a character string in a front portion of the same phrase as the selected phrase from the system utterance immediately before the user utterance, and generates a system response.

Note that in the system response generation process of steps S205, S206, it is preferable to perform a process of formatting the extracted words and phrases as a sentence. For example, "desu" or "masu" is added to the end of the phrase. It is preferable to perform a process such that, in a case where the word at the end of the phrase is an adjective conjugation or noun, "desu" is added, and in a case where it is a verb conjugation, "masu" is added after modifying the verb to a continuous form.

As described above, in the user utterance type determination unit 122, in a case where the user utterance is of utterance type B1, that is, (B1) User utterance requesting a system utterance part as a reutterance request target by specifying an utterance position of system utterance (specified position partial reutterance request)

in a case where the user utterance is determined to be of type B1 described above, the specified position partial reutterance unit (type B1 processing unit) 141b1 generates a system response.

The specified position partial reutterance unit (type B1 processing unit) 141b1 that generates a system utterance (response) specifies a reutterance execution part according to a phrase included in the user utterance from the system utterance executed immediately before the user utterance, and generates system reutterance data by selecting the specified reutterance execution part.

Note that in a case where the system utterance immediately before the user utterance is as follows, System utterance="Break 3 eggs and put them in a bowl. Beat the eggs and sprinkle with salt and pepper. Heat the butter over a fire."

In a case of including multiple sentences as described above, the utterance may be divided into sentences by separating them with a punctuation mark ".", and from the beginning of the sentence to before the phrase indicating the end position, or from the end of the phrase indicating the start position to the end of the sentence may be output. In this manner, it is possible to prevent output of a long string across sentences such as "Break 3 eggs and put them in a bowl. Beat the eggs" or "Sprinkle salt and pepper. Heat the butter over a fire."

Furthermore, in a case where a character string that exactly matches the phrase extracted from the user utterance indicating the start position or end position of the partial reutterance is not found in the system utterance immediately before the user utterance, another phrase that is conceptually similar to the phrase extracted from the user utterance may be selected as a corresponding phrase from the system utterance.

For example, it is assumed that the following system utterances and user utterance are executed.

System utterance=First, beat the egg and sprinkle salt and pepper. Next, heat the egg mixture over a fire while stirring it.

User utterance=What did you say after mix the egg

At this time, a phrase extracted from the user utterance, that is, "mix the egg" is extracted as a phrase indicating the start position of the partial reutterance.

However, phrases that match this phrase are not included in the system utterance. In such a case, the expression "mix the egg", which is conceptually similar to "beat the egg", is selected from the system utterance as a corresponding phrase.

Thereafter, the substring "Sprinkle salt and pepper" after "beat the egg" in the system utterance is extracted, and the system response based on this extracted data is generated and output.

As the determination process for whether or not expressions are conceptually similar, for example, a method using a dictionary summarizing similar expressions, a method based on word distribution similarity (method that assumes expressions having similar distributions of peripheral words can be paraphrased with each other), or the like can be applied.

[5-3. Processing executed by specified time-series partial reutterance unit (type B2 processing unit) that generates system utterance (response) in case where utterance type of user utterance is type B2]

Next, the process executed by the specified time-series partial reutterance unit (type B2 processing unit) 141b2 that generates the system utterance (response) in a case where the utterance type of the user utterance is type B2 will be described.

In the user utterance type determination unit 122, in a case where the user utterance is of utterance type B2, that is, (B2) User utterance requesting a system utterance part as a reutterance request target by specifying a temporally before-after relationship of system utterance content (specified time-series partial reutterance request)

in a case where the user utterance is determined to be of type B2 described above, the specified time-series partial reutterance unit (type B2 processing unit) 141b2 generates a system response.

The specified time-series partial reutterance unit (type B2 processing unit) 141b2 that generates the system utterance (response) specifies a reutterance execution part according to time-series specification information included in the user utterance from the system utterance executed immediately before the user utterance, and generates system reutterance data by selecting the identified reutterance execution part.

Note that the time-series specification information refers to two pieces of information, an event to be a time-series reference (hereinafter, a reference event) and whether a matter that the user wants to know is in the past or the future from the reference event (hereinafter, the time-series direction). Furthermore, the event refers to an incident, and a set of one predicate (predicate part is also possible) and its clause (subject, object, or the like), such as "the prime minister had a dinner", is regarded as one unit.

An example of the input-output data of the specified time-series partial reutterance unit (type B2 processing unit) 141b2 will be described below as an example of processing executed by the specified time-series partial reutterance unit (type B2 processing unit) 141b2.

Processing Example 1

(1a) Input Data

The input data are a system utterance immediately before a user utterance and the user utterance. For example, it is the following system utterance and user utterance.

System utterance=Beat the egg and sprinkle salt and pepper

User utterance=What to do after beating the egg

In these pieces of data, the system utterance is acquired from the storage unit 160, and the user utterance is acquired from the voice recognition unit 121.

(1b) Output Data

On the basis of the input data described above, the specified time-series partial reutterance unit (type B2 processing unit) 141*b*2 specifies a reutterance execution part according to the time-series specification information included in the user utterance, selects the specified reutterance execution part, and generates system reutterance data. For example, the following system utterance is generated as output data.

System utterance=Please sprinkle salt and pepper

Another example of processing executed by the specified time-series partial reutterance unit (type B2 processing unit) 141*b*2 will be described below.

Processing Example 2

(2a) Input data

System utterance=There are a meeting at 13:00 and social gathering at 19:00

User utterance=What is before the social gathering (2b) Output data

On the basis of the input data described above, the specified time-series partial reutterance unit (type B2 processing unit) 141*b*2 specifies a reutterance execution part according to the time-series specification information included in the user utterance, selects the specified reutterance execution part, and generates system reutterance data. For example, the following system utterance is generated as output data.

System utterance=There is a meeting at 13:00

Another example of processing executed by the specified time-series partial reutterance unit (type B2 processing unit) 141*b*2 will be described below.

Processing Example 3

(3a) Input data

System utterance=The prime minister will attend the meeting and then have a dinner with executives User utterance=What does the prime minister do before dinner (3b) Output data On the basis of the input data described above, the specified time-series partial reutterance unit (type B2 processing unit) 141*b*2 specifies a reutterance execution part according to the time-series specification information included in the user utterance, selects the specified reutterance execution part, and generates system reutterance data. For example, the following system utterance is generated as output data.

System utterance=The prime minister will attend the meeting

The specified time-series partial reutterance unit (type B2 processing unit) 141*b*2 specifies a reutterance execution part according to the time-series specification information included in the user utterance, selects a specified reutterance execution part, and generates system reutterance data.

Specifically, a process of extracting an event to be a time-series reference (hereinafter, a reference event) from a voice recognition text of a user utterance and whether a matter that the user wants to know (reutterance request event) is in the past or future of the reference event (hereinafter, time-series direction) are analyzed, a reutterance request event is selected from the system utterance on the basis of an analysis result thereof, and system reutterance data including the selected reutterance request event is generated.

For each of the above (Processing examples 1 to 3), analysis processing of the reference event and time-series direction (past/future) executed by the specified time-series partial reutterance unit (type B2 processing unit) 141*b*2, and a selection processing example of a reutterance request event based on an analysis result will be described.

Processing Example 1

System utterance=Beat the egg and sprinkle salt and pepper

User utterance=What to do after beating the egg

The specified time-series partial reutterance unit (type B2 processing unit) 141*b*2 acquires the following reference event and time-series direction (past/future) by analyzing the system utterance and user utterance.

Reference event="Beating the egg",

Time-series direction="Future"

Moreover, the specified time-series partial reutterance unit (type B2 processing unit) 141*b*2 selects an event in the future from reference event included in the system utterance as a reutterance request event on the basis of the reference event and time-series direction (future) described above.

Reutterance request event=Sprinkle salt and pepper

The specified time-series partial reutterance unit (type B2 processing unit) 141*b*2 generates system reutterance data including the above-described reutterance request event.

Processing Example 2

System utterance=There are a meeting at 13:00 and social gathering at 19:00

User utterance=What is before the social gathering

The specified time-series partial reutterance unit (type B2 processing unit) 141*b*2 acquires the following reference event and time-series direction (past/future) by analyzing the system utterance and user utterance.

Reference event="Social gathering",

Time-series direction="Past"

Moreover, the specified time-series partial reutterance unit (type B2 processing unit) 141*b*2 selects an event in the past of the reference event included in the system utterance as a reutterance request event on the basis of the reference event and the time-series direction (past) described above.

Reutterance request event=Meeting at 13:00

The specified time-series partial reutterance unit (type B2 processing unit) 141*b*2 generates system reutterance data including the above-described reutterance request event.

Processing Example 3

System utterance=The prime minister will attend the meeting and then have a dinner with executives User utterance=What does the prime minister do before dinner The specified time-series partial reutterance unit (type B2 processing unit) 141*b*2 acquires the following reference event and time-series direction (past/future) by analyzing the system utterance and user utterance.

Reference event="The prime minister has a dinner", Time-series direction="Past"

Moreover, the specified time-series partial reutterance unit (type B2 processing unit) 141*b*2 selects an event in the past of the reference event included in the system utterance as a reutterance request event on the basis of the reference event and the time-series direction (past) described above.

Reutterance Request Event=The prime minister will attend the meeting

The specified time-series partial reutterance unit (type B2 processing unit) 141*b*2 generates system reutterance data including the above-described reutterance request event.

As described above, the specified time-series partial reutterance unit (type B2 processing unit) 141*b*2 acquires a process of extracting a reference event to be a time-series reference from the user utterance text, and a time-series direction that indicates whether a matter that the user wants to know (reutterance request event) is in the past or future from the reference event. Moreover, the reutterance request event is selected from the system utterance, and system reutterance data including the selected reutterance request event is generated.

Note that a phrase extraction process indicating the reference event from the user utterance can be executed by a process similar to the phrase extraction process that indicates the start position or the end position of a partial reutterance executed by the specified position partial reutterance unit (type B1 processing unit) 141*b*1 described previously.

That is, it is possible to execute the phrase extraction process that estimates a label (IOB2 tag) for each morpheme (notation, part of speech) using the estimation model generated in advance and indicates the reference event.

Note that in a case where a conjugation word that is not in a basic form, such as "beating" is included in the phrase indicating the reference event, this may be converted to a basic form (in this case, "beat").

For the time-series direction, there are two choices, "past" or "future". The estimating in the time-series direction may be performed on the basis of a manually created dictionary (data that associates words with distinction of past or future, such as past for "before" and future for "after"), or any machine learning technique may be used.

A method of extracting the reutterance request event located in the past or future of the reference event from the system utterance depends on the structure of an information source applied to generation of the system utterance.

That is, the process differs between a case where the information source applied to generation of the system utterance is of a structure having clear time-series events and a case of a structure in which it is unclear.

An example of a data structure of the information source applied to generation of the system utterance will be described with reference to FIG. 16.

The information source is a recipe information providing server, a news information providing server, or the like acquired by the information processing device 10. Various information is recorded in a database in these information providing servers. Database recorded data has various different structures in each server. For example, there are following three types of data structures (A) to (C) as illustrated in FIG. 16.

(A) Structure in which time order in which events occur (or occurred) is defined.

(B) Structure in which only part of time order in which events occur (or occurred) is defined.

(C) Structure in which time order in which events occur (or occurred) is not defined.

In a case where the information source data is data whose time order is defined for each event as illustrated in FIG. 16(A), the time order between a reference event and other events is clear, and it is possible to select an event that is in the past or future of the reference event.

Note that in a case where a phrase that exactly matches a phrase corresponding to the reference event extracted from the user utterance is not found in the system utterance (=information source data), a process of selecting a phrase having another expression that is conceptually similar to the phrase of the reference event is performed.

As the determination process for whether or not expressions are conceptually similar, for example, a method using a dictionary summarizing similar expressions, a method based on word distribution similarity (method that assumes expressions having similar distributions of peripheral words can be paraphrased with each other), or the like can be applied.

Furthermore, in a case where the information source data contains events whose chronological order is unclear as illustrated in FIGS. 16(B) and 16(C), the specified time-series partial reutterance unit (type B2 processing unit) 141*b*2 analyzes the information source data, and divides it into individual events and estimates the time order of each event.

For example, the specified time-series partial reutterance unit (type B2 processing unit) 141*b*2 divides multiple phrases whose time order is unclear on the basis of the punctuation mark "." and the conjunction particle "te", or the like, and executes a process of setting the time order from a preceding phrase in order. A result of this is used to select past or future events of the reference event.

The sequence of processing executed by the specified time-series partial reutterance unit (type B2 processing unit) 141*b*2 will be described with reference to a flowchart illustrated in FIG. 17.

Hereinafter, processes of respective steps of the flow illustrated in FIG. 17 will be described in order.

(Step S301)

First, in step S301, the specified time-series partial reutterance unit (type B2 processing unit) 141*b*2 executes a morphological analysis of a user utterance text to be analyzed input from the voice recognition unit 121, and divides the user utterance text into morpheme (notation/part of speech) units.

(Step S302)

Next, in step S302, a phrase extraction label is set to each of morphemes of the user utterance text classified in step S301.

This process is the process described above with reference to FIG. 14. That is, for example, an IOB2 tag is set as a phrase extraction label.

(Step S303)

In step S302, when setting of the phrase extraction label (IOB2 tag) for each of the morphemes of the user utterance text divided in step S301 is completed, a process of step S303 is executed next.

In step S303, the specified time-series partial reutterance unit (type B2 processing unit) 141*b*2 extracts an event to be a time-series reference (reference event) from the user utterance by using data generated in step S302, that is, an estimation result of the phrase extraction label (IOB2 tag) for each morpheme of the user utterance text.

(Steps S304 to S305)

In step S303, after extracting an event to be a time-series reference (reference event) from the user utterance, the specified time-series partial reutterance unit (type B2 processing unit) 141b2 determines whether a matter that the user wants to know (reutterance request event) is in the past or future of the reference event in steps S304 to S305.

In a case where it is determined that the matter that the user wants to know (reutterance request event) is in the past of the reference event, the process proceeds to step S306.

On the other hand, in a case where it is determined that the matter that the user wants to know (reutterance request event) is in the future of the reference event, the process proceeds to step S307.

(Step S306)

In a case where it is determined in steps S304 to S305 that the matter that the user wants to know (reutterance request event) is in the past of the reference event, the process proceeds to step S306.

In step S306, the specified time-series partial reutterance unit (type B2 processing unit) 141b2 extracts, from the system utterance, a character string (phrase) that matches a phrase corresponding to the reference event extracted from the user utterance, and further selects an event located in the past (immediately previously) of an event corresponding to the phrase as the reutterance request event.

(Step S307)

On the other hand, in a case where it is determined in steps S304 to S305 that the matter that the user wants to know (reutterance request event) is in the future of the reference event, the process proceeds to step S307.

In step S307, the specified time-series partial reutterance unit (type B2 processing unit) 141b2 extracts, from the system utterance, a character string (phrase) that matches the phrase corresponding to the reference event extracted from the user utterance, and further selects an event located in the future (immediately after) of the event corresponding to the phrase as the reutterance request event.

(Step S308)

Finally, the specified time-series partial reutterance unit (type B2 processing unit) 141b2 generates a system response in step S308 using the reutterance request event selected in step S306 or step S307.

Note that in the system response generation process, it is preferable to perform a process of formatting the extracted words and phrases as a sentence. For example, "desu" or "masu" is added to the end of the phrase. It is preferable to perform a process such that, in a case where the word at the end of the phrase is an adjective conjugation or noun, "desu" is added, and in a case where it is a verb conjugation, "masu" is added after modifying the verb to a continuous form.

In this manner, the specified time-series partial reutterance unit (type B2 processing unit) 141b2 acquires a process of extracting a reference event that serves as a time-series reference from the user utterance text, and a time-series direction that indicates whether a matter that the user wants to know (reutterance request event) is in the past or future of the reference event. Moreover, the reutterance request event is selected from the system utterance, and system reutterance data including the selected reutterance request event is generated.

[5-4. Processing executed by local question partial reutterance unit (type B3 processing unit) that generates system utterance (response) in case where utterance type of user utterance is type B3]

Next, a processing executed by the local question partial reutterance unit (type B3 processing unit) 141b3 that generates a system utterance (response) in a case where the utterance type of the user utterance is type B3 will be described.

In the user utterance type determination unit 122, in a case where the user utterance is of utterance type B3, that is, (B3) Other user utterance requesting a partial reutterance (local question partial reutterance request)

in a case where the user utterance is determined to be of type B3 described above, the local question partial reutterance unit (type B3 processing unit) 141b3 generates a system response.

This type (B3) is a user utterance that does not include the utterance position specification like type (B1) or the time-series specification like type (B2), but is a user utterance of a type that requests for a reutterance of part of phrases that have already been uttered in the previous system utterance.

The local question partial reutterance unit (type B3 processing unit) 141b3 that generates the system utterance (response) specifies a reutterance execution part according to information included in a user utterance from a system utterance executed immediately before the user utterance, and generates a system reutterance data by selecting the specified reutterance execution part.

An example of input-output data of the local question partial reutterance unit (type B3 processing unit) 141b3 will be described below as an example of processing executed by the local question partial reutterance unit (type B3 processing unit) 141b3.

Processing Example 1

(1a) Input data

The input data are a system utterance immediately before a user utterance and the user utterance. For example, it is the following system utterance and user utterance.

System utterance=You are scheduled to meet with Mr. Suzuki this week and Mr. Sato next week User utterance=Who am I going to meet next week In these pieces of data, the system utterance is acquired from the storage unit 160, and the user utterance is acquired from the voice recognition unit 121.

(1b) Output data

On the basis of the input data described above, the local question partial reutterance unit (type B3 processing unit) 141b3 specifies a reutterance execution part according to information included in a user utterance, selects the specified reutterance execution part, and generates a system reutterance data. For example, the following system utterance is generated as output data.

System utterance=It is Mr. Sato

Another example of processing executed by the local question partial reutterance unit (type B3 processing unit) 141b3 will be described below.

Processing Example 2

(2a) Input data

System utterance=Heat the egg mixture over a fire while stirring it

User utterance=What to stir (2b) Output data

On the basis of the input data described above, the local question partial reutterance unit (type B3 processing unit) 141b3 specifies a reutterance execution part according to information included in a user utterance, selects the specified reutterance execution part, and generates a system reutterance data. For example, the following system utterance is generated as output data.

System utterance=The egg mixture

The local question partial reutterance request (type B3 processing unit) 141*b*3 specifies a reutterance execution part according to information included in the user utterance, selects the specified reutterance execution part, and generates system reutterance data.

Specifically, first, a phrase that is an answer to the user utterance is extracted from the system utterance immediately before the user utterance.

Next, the extracted phrase is formatted and output as a sentence.

For example, in the above (Processing example 1),

System utterance=You are scheduled to meet with Mr. Suzuki this week and Mr. Sato next week User utterance=Who am I going to meet next week As a method to obtain a phrase that is an answer to this user utterance, it is only required to extract a word or a word string suitable as an answer from the system utterance according to the question type (who, where, when).

However, in the case of the above-described (Processing example 1), there are multiple answer candidates (personal names) for "who" in the system utterance immediately before (Mr. Suzuki, Mr. Sato). In a case where there are multiple answer candidates in this manner, for example, the distance to a word included in the user utterance (how many words are separated) is analyzed, and a score that becomes higher as the distance is shorter is calculated. Moreover, the candidate with the highest score is selected.

In the above-described (Processing example 1), in the system utterance immediately before the user utterance, "Mr. Sato" is at a position closer to the word "next week" included in the user utterance than "Mr. Suzuki", and thus "Mr. Sato" is selected as a word to reutter.

Furthermore, in the above-described (Processing example 2),

System utterance=Heat the egg mixture over a fire while stirring it

User utterance=What to stir

It is necessary to acquire a phrase that is an answer to "what" in the above-described user utterance.

In this case, it is only required to assume words that cannot be an answer by other question types (who, where, when) (for example, nouns other than personal names, place names, and dates and times) as answer candidates.

In the case of the above-described (Processing example 2), there are multiple answer candidates (nouns other than personal names, place names, dates and times) for "what" in the system utterance immediately before the user utterance (egg mixture, fire).

In a case where there are multiple answer candidates in this manner, as illustrated in the description of the (Processing example 1), the score based on the distance from a word included in the user utterance is calculated, and a word with a high score is selected.

Alternatively, a modification relationship analysis of the system utterance immediately before the user utterance may be executed, and a word included in a phrase included in the system utterance that has a modification relationship with a phrase including a word included in the user utterance may be selected as a word of the reutterance candidate.

For example, the phrase "egg mixture" in a system utterance including "egg mixture" has a modification relationship with the phrase "while stirring it" including the word "stir" included in the user utterance, but since the phrase "over a fire" including "fire" does not, it is possible to make a selection giving priority to "egg mixture" over "fire" as an answer phrase for "what to stir".

[6. Processing executed by general question processing unit (type C processing unit) that generates system utterance (response) in case where utterance type of user utterance is type C]

Next, processing executed by the general question processing unit (type C processing unit) 142 that generates a system utterance (response) in case where the utterance type of the user utterance is type C will be described.

In the user utterance type determination unit 122, in a case where the user utterance is of utterance type C, that is, (C) User utterance asking general knowledge (global question)

in a case where the user utterance is determined to be of type C described above, the general question processing unit (type C processing unit) 142 generates a system response.

This type C is a type of user utterance including a general question that does not require reutterance of a phrase already uttered in the system utterance immediately before the user utterance.

An example of input-output data of the general question processing unit (type C processing unit) 142 will be described below as an example of processing executed by the general question processing unit (type C processing unit) 142.

Processing Example 1

(1a) Input Data

The input data are a system utterance immediately before a user utterance and the user utterance. For example, it is the following system utterance and user utterance.

System utterance=Heat the egg mixture over a fire while stirring it

User utterance=Where is the production of eggs high? In these pieces of data, the system utterance is acquired from the storage unit 160, and the user utterance is acquired from the voice recognition unit 121.

(1b) Output Data

On the basis of the input data described above, the general question processing unit (type C processing unit) 142 acquires an answer corresponding to the question included in the user utterance, and generates system utterance data using the acquired answer. For example, the following system utterance is generated as output data.

System utterance=That is Ibaraki prefecture

Another example of processing executed by the general question processing unit (type C processing unit) 142 will be described below.

Processing Example 2

(2a) Input Data

System utterance=Heat the egg mixture over a fire while stirring it

User utterance=What is egg mixture (2b) Output Data

On the basis of the input data described above, the general question processing unit (type C processing unit) 142 acquires an answer corresponding to the question included in the user utterance, and generates system utterance data using the acquired answer. For example, the following system utterance is generated as output data.

System utterance=It is egg taken out of the shell to have only the contents

The general question processing unit (type C processing unit) 142 acquires an answer corresponding to the question included in the user utterance, and generates system utterance data using the acquired answer.

For example, as a method of acquiring a phrase that is an answer of the above-described (Processing example 1), various external document databases are searched and a document (article) related to the user utterance is extracted. Moreover, from the extracted document, according to the question type (who, where, when), an appropriate word as an answer (word indicating a personal name for "who", a place for "where", a date and time for "when") is extracted, and a system response is generated using the extracted words.

Furthermore, in a case of a question that asks the definition of a word in a format such as "what is <word>" as in the above-described (Processing example 2), a Japanese dictionary is searched to obtain a definition sentence of the <word>, and a system response is generated using the acquired sentence. For the Japanese dictionary, stored dictionary data of the storage unit 160 or stored dictionary data of an external server is used.

Note that when the extracted words and phrases are formatted and output as a sentence, for example, it is only required to add "desu" or "masu" to the end of the phrase. In a case where the word at the end of the phrase is an adjective conjugation or noun, it is only required to add "desu", and in a case where it is a verb conjugation, it is only required to add "masu" after modifying the verb to a continuous form.

[7. Processing executed by task processing unit that generates system utterance (response) in case where utterance type of user utterance is none of types A to C]

Next, processing executed by the task processing unit 143 that generates a system utterance (response) in a case where the utterance type of the user utterance is none of types A to C will be described.

In the user utterance type determination unit 122, in a case where the user utterance is determined to be of none of utterance types A to C, the task processing unit 143 generates a system response.

Generating the system response by the task processing unit 143 is a process in a case where the user utterance does not request a reutterance of the system utterance executed immediately before, and specifically, a case where the user utterance requests the execution of some task.

For example, user utterances such as "tell me the weather forecast" and "tell me today's schedule". These are not utterances to request a reutterance of the system utterance executed immediately before the user utterance, but are utterances in which the user requests the information processing device 10 to execute some task.

An example of input-output data of the task processing unit 143 will be described below as an example of processing executed by the task processing unit 143.

Processing Example 1

(1a) Input Data

The input data is a user utterance. For example, it is a user utterance as follows.

User utterance=Tell me today's schedule

The user utterance is acquired from the voice recognition unit 121.

(1b) Output Data

On the basis of the input data described above, the task processing unit 143 analyzes the user utterance and generates system utterance data according to the request of the user. For example, the following system utterance is generated as output data.

System utterance=There are a meeting at 13:00 and social gathering at 19:00

The task processing unit 143 analyzes the user utterance, executes a process according to a request (task) of the user, that is, executes a task, and generates system utterance data accompanying the execution of the task as necessary.

Figure 18:
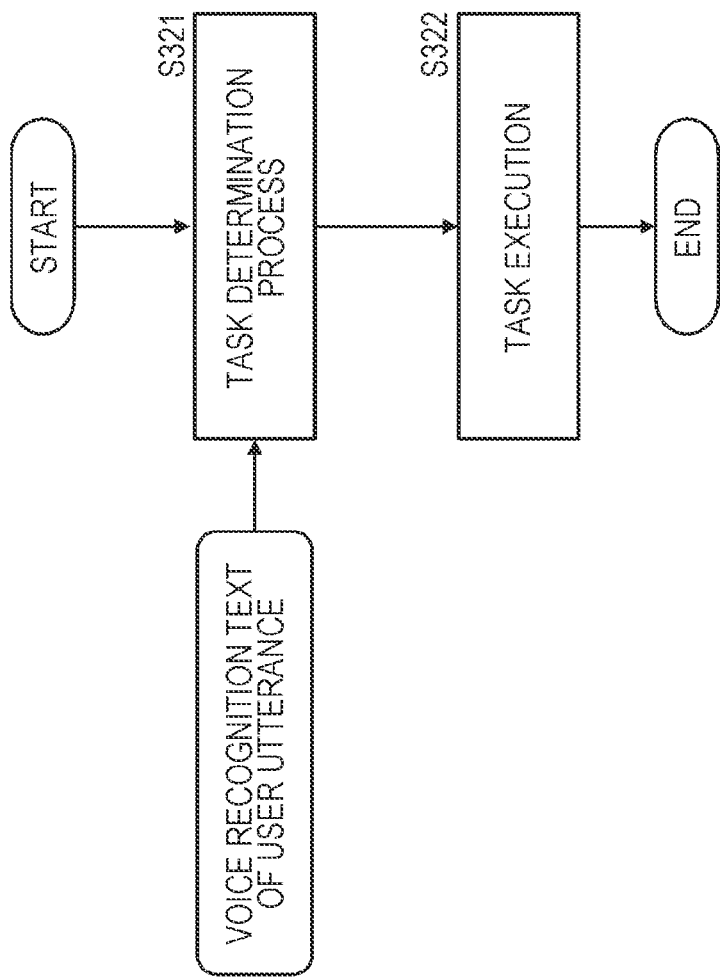
FIG. 18 is a diagram illustrating a flowchart describing a processing sequence executed by a task processing unit of the information processing device.

FIG. 18 is a flowchart describing a processing sequence executed by the task processing unit 143. Processes of respective steps of the flow illustrated in FIG. 18 will be described.

(Step S321)

First, in step S321, the task processing unit 143 inputs a user utterance text from the voice recognition unit 121, and determines content of a requested task of the user on the basis of the input user utterance text.

For example, the type of the task requested by the user (recipe search, schedule check, news search, or the like) is determined.

(Step S322)

Next, in step S322, the task processing unit 143 executes a task according to the content of the task analyzed in step S321.

For example, a recipe search, schedule check, news search, or the like is executed. These are executed by referring to information input from a recipe providing server and a news providing server connected via the communication unit 170, or schedule data recorded in advance in the storage unit 160 of the information processing device 10, or the like.

Note that the input information used in the task determination process in step S201 is not limited only to the user utterance, but may include a system utterance immediately before the user utterance, a past dialogue history (user utterance, system response, execution result of a called application, and the like).

[8. Configuration Examples of Information Processing Device and Information Processing System]

Although the processing executed by the information processing device 10 of the present disclosure has been described, as described above with reference to FIG. 6, it is possible to configure all processing functions of respective components of the information processing device 10 illustrated in FIG. 6 in, for example, an agent device owned by a user or a device such as a smartphone, a PC, or the like, but it is also possible to configure a part thereof to be executed in a server or the like.

Figure 19:
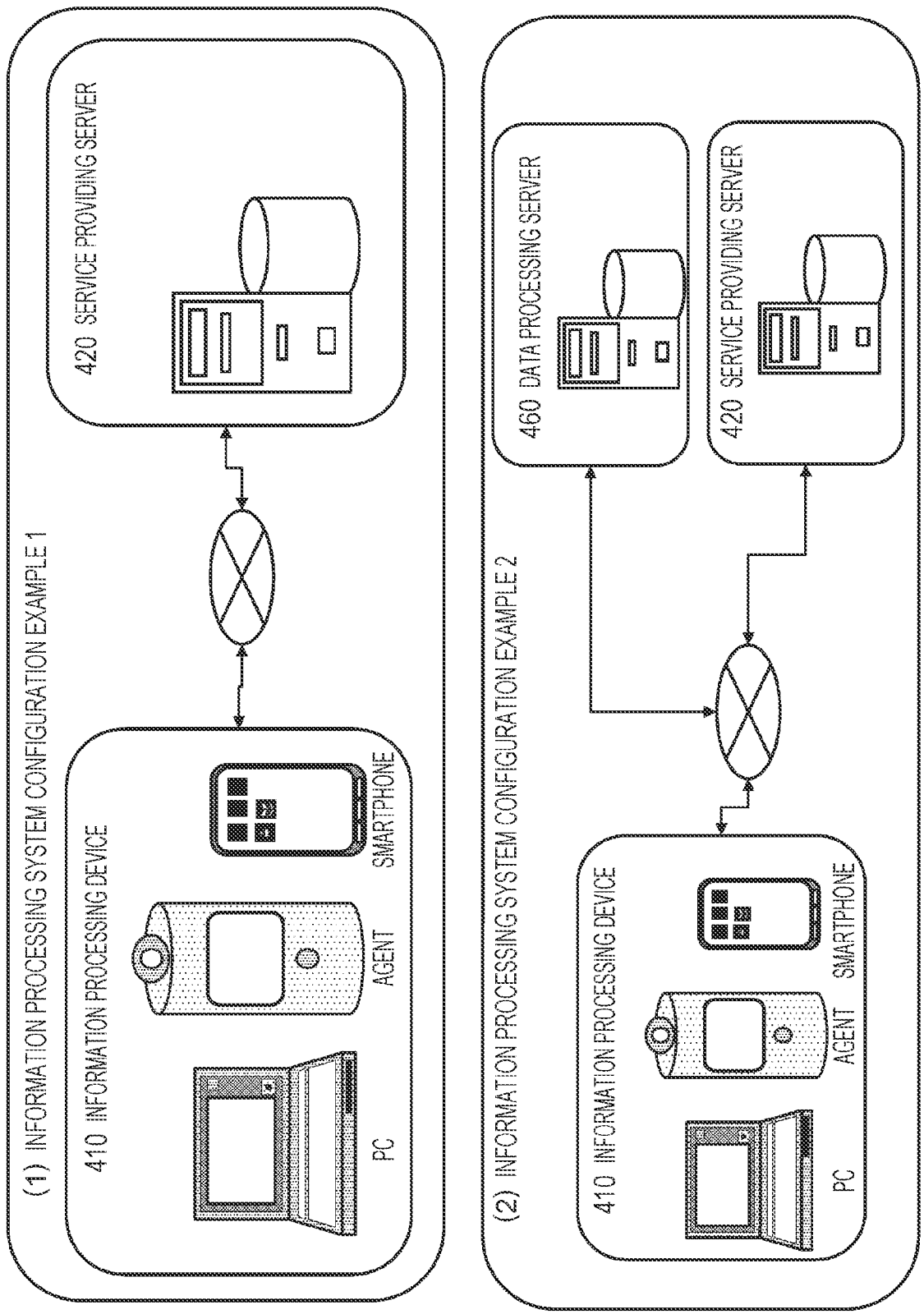
FIG. 19 is a diagram describing a configuration example of the information processing system.

FIG. 19 illustrates a system configuration example.

(1) Information processing system configuration example 1 of FIG. 19 is an example in which almost all functions of the information processing device illustrated in FIG. 6 are configured in one device, for example, an information processing device 410 that is a user terminal such as a smartphone, a PC, or an agent device having voice input-output and image input-output functions, or the like owned by the user.

The information processing device 410 corresponding to the user terminal executes communication with a service providing server 420 only in a case where, for example, an external service is used when generating a response sentence.

The service providing server 420 is, for example, a music providing server, a content providing server for movies and the like, a game server, a weather information providing server, a traffic information providing server, a medical information providing server, a tourist information providing server, and the like, and includes a group of servers that can provide information necessary for execution of processing for user utterance and response generation.

On the other hand, (2) Information processing system configuration example 2 of FIG. 19 is a system example in which a part of functions of the information processing device illustrated in FIG. 6 is configured in the information processing device 410 that is a user terminal such as a smartphone, a PC, or an agent device owned by the user, and configured to be partially executed by a data processing server 460 capable of communicating with the information processing device.

For example, a configuration or the like is possible such that only the voice input unit 101, the voice output unit 102, and the image output unit 103 in the device illustrated in FIG. 6 are provided on the information processing device 410 side of the user terminal, and all other functions are executed on the server side.

Note that a function dividing mode for the functions on the user terminal side and the functions on the server side can be set in various different ways, and a configuration to execute one function by both is also possible.

[9. Hardware Configuration Example of Information Processing Device]

Next, a hardware configuration example of the information processing device will be described with reference to FIG. 20.

The hardware described with reference to FIG. 20 is a hardware configuration example of the information processing device described in advance with reference to FIG. 6, and is an example of the hardware configuration of the information processing device forming the data processing server 460 described with reference to FIG. 19.

A central processing unit (CPU) 501 functions as a control unit or a data processing unit that executes various processes according to a program stored in a read only memory (ROM) 502 or a storage unit 508. For example, processes according to the sequence described in the above-described embodiment are executed. A random access memory (RAM) 503 stores programs, data, and the like to be executed by the CPU 501. The CPU 501, the ROM 502, and the RAM 503 are connected to each other by a bus 504.

The CPU 501 is connected to an input-output interface 505 via the bus 504, and to the input-output interface 505, an input unit 506 that includes various switches, a keyboard, a mouse, a microphone, a sensor, or the like, and an output unit 507 that includes a display, a speaker, and the like are connected. The CPU 501 executes various processes corresponding to a command input from the input unit 506, and outputs a processing result to the output unit 507, for example.

The storage unit 508 connected to the input-output interface 505 includes, for example, a hard disk, and the like and stores programs executed by the CPU 501 and various data. The communication unit 509 functions as a transmission-reception unit for Wi-Fi communication, Bluetooth (registered trademark) (BT) communication, and other data communication via a network such as the Internet or a local area network, and communicates with an external device.

A drive 510 connected to the input-output interface 505 drives a removable medium 511 such as a magnetic disk, an optical disk, a magneto-optical disk, or a semiconductor memory such as a memory card, and executes recording or reading of data.

[10. Summary of Configuration of the Present Disclosure]

As described above, the embodiment of the present disclosure has been described in detail with reference to a particular embodiment. However, it is obvious that those skilled in the art can make modifications and substitutions of the embodiment without departing from the gist of the present disclosure. In other words, the present invention has been disclosed in the form of exemplification, and should not be interpreted in a limited manner. In order to determine the gist of the present disclosure, the claims should be taken into consideration.

Note that the technology disclosed in the present description can take the following configurations.

(1) An information processing device including:
 a user utterance type determination unit that determines an utterance type of a user utterance; and
 a system response generation unit that generates a system response according to a type determination result determined by the user utterance type determination unit,
 in which the user utterance type determination unit determines which type of type A or type B below the user utterance is,
 (Type A) user utterance that requests all reutterances of a system utterance immediately before the user utterance,
 (Type B) user utterance that requests a reutterance of a part of the system utterance immediately before the user utterance,
 the system response generation unit
 generates a system response to reutter all system utterances immediately before the user utterance in a case where the user utterance is of type A, and
 generates a system response to reutter a part of system utterances immediately before the user utterance in a case where the user utterance is of type B.

(2) The information processing device according to (1), in which
 the user utterance type determination unit further determines
 whether or not the user utterance is
 (Type C) User utterance asking general knowledge, and
 the system response generation unit generates a system response including an answer to a question of the user utterance in a case where the user utterance is of type C.

(3) The information processing device according to (1) or (2), in which
 the user utterance type determination unit further determines
 whether or not the user utterance is
 (Other type) user utterance of task request type,
 the system response generation unit
 generates a system response as a result of executing a requested task of the user utterance in a case where the user utterance is of the other type.

(4) The information processing device according to any one of (1) to (3), in which
 the user utterance type determination unit,
 in a case where the user utterance is determined to be
 (Type B) user utterance that requests a reutterance of a part of the system utterance immediately before the user utterance,
 further determines which type of type B1, B2, or B3 below the user utterance is,
 (Type B1) user utterance requesting a reutterance of a specified position part of the system utterance,
 (Type B2) user utterance requesting a reutterance of a specified time-series part of the system utterance, or (Type B3) user utterance requesting a partial reutterance other than the B1 and B2 described above.

(5) The information processing device according to (4), in which the system response generation unit, in a case where the user utterance is of type B1, analyzes a user utterance text, which is a voice recognition result of the user utterance, and selects a reutterance part of the system utterance.

(6) The information processing device according to (5), in which the label is a label that makes it possible to identify a phrase immediately before or immediately after the reutterance part to be selected from the system utterance.

(7) The information processing device according to (4), in which the system response generation unit, in a case where the user utterance is of type B2, analyzes a user utterance text, which is a voice recognition result of the user utterance, extracts a reference event to be a time-series reference, further determines a time-series direction of whether the reutterance request event is in past or future of the reference event, and selects a reutterance part of the system utterance on the basis of the reference event and the time-series direction.

(8) The information processing device according to (7), in which the system response generation unit, in a case where it is determined that the reutterance request event is in the past of the reference event, selects, as the reutterance part, a phrase that includes an event that occurs or has occurred before the reference event from the system utterance.

(9) The information processing device according to (7), in which the system response generation unit, in a case where it is determined that the reutterance request event is the future of the reference event, selects, as the reutterance part, a phrase that includes an event that occurs or has occurred after the reference event from the system utterance.

(10) An information processing system including a user terminal and a data processing server, in which the user terminal has:

a voice input unit that inputs a user utterance; and a communication unit that transmits the input user utterance to the data processing server, the data processing server has:

a user utterance type determination unit that determines an utterance type of the user utterance received from the user terminal; and a system response generation unit that generates a system response according to a type determination result determined by the user utterance type determination unit, and the user utterance type determination unit determines which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation unit generates a system response to reutter all system utterances immediately before the user utterance in a case where the user utterance is of type A, and generates a system response to reutter a part of system utterances immediately before the user utterance in a case where the user utterance is of type B.

(11) An information processing method executed in an information processing device, the method including:

a user utterance type determination step in which a user utterance type determination unit determines an utterance type of a user utterance; and a system response generation step in which a system response generation unit generates a system response according to a type determination result in the user utterance type determination step, in which the user utterance type determination step determines which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation step generates a system response to reutter all system utterances immediately before the user utterance in a case where the user utterance is of type A, and generates a system response to reutter a part of system utterances immediately before the user utterance in a case where the user utterance is of type B.

(12) An information processing method executed in an information processing system including a user terminal and a data processing server, in which the user terminal inputs a user utterance via a voice input unit and transmits the user utterance to the data processing server, the data processing server executes a user utterance type determination process that determines an utterance type of the user utterance received from the user terminal, and a system response generation process that generates a system response according to a type determination result determined by the user utterance type determination unit, the user utterance type determination process determines which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation process generates a system response to reutter all system utterances immediately before the user utterance in a case where the user utterance is of type A, and generates a system response to reutter a part of system utterances immediately before the user utterance in a case where the user utterance is of type B.

(13) A program that causes an information processing device to execute information processing including:

a user utterance type determination step of causing a user utterance type determination unit to determine an utterance type of a user utterance; and a system response generation step of causing a system response generation unit to generate a system response according to a type determination result in the user utterance type determination step, in which the user utterance type determination step performs a process to determine which type of type A or type B below the user utterance is, (Type A) user utterance that requests all reutterances of a system utterance immediately before the user utterance, (Type B) user utterance that requests a reutterance of a part of the system utterance immediately before the user utterance, the system response generation step performs a process to generate a system response to reutter all system utterances immediately before the user utterance in a case where the user utterance is of type A, and generate a system response to reutter a part of system utterances immediately before the user utterance in a case where the user utterance is of type B.

Furthermore, a series of processes described in the description can be executed by hardware, software, or a combined configuration of the both. In a case of executing processes by software, a program recording a processing sequence can be installed and run on a memory in a computer incorporated in dedicated hardware, or the program can be installed and run on a general-purpose computer capable of executing various processes. For example, the program can be recorded in advance on a recording medium. In addition to being installed on a computer from a recording medium, the program can be received via a network such as a local area network (LAN) or the Internet and installed on a recording medium such as an internal hard disk.

Note that the various processes described in the description are not only executed in time series according to the description, but may be executed in parallel or individually according to processing capability of the device that executes the processes or as necessary. Furthermore, a system in the present description is a logical set configuration of a plurality of devices, and is not limited to one in which devices with respective configurations are in the same housing.

INDUSTRIAL APPLICABILITY

As described above, according to a configuration of one embodiment of the present disclosure, a device and a method that determine an utterance type of a user utterance and generate a system response according to a determination result are achieved.

Specifically, for example, it has a user utterance type determination unit that determines an utterance type of a user utterance, and a system response generation unit that generates a system response according to a type determination result determined by the user utterance type determination unit. The user utterance type determination unit determines whether the user utterance is of type A that requests all reutterances of a system utterance immediately before the user utterance, or type B that requests a reutterance of a part of the system utterance immediately before the user utterance. The system response generation unit generates a system response to reutter all system utterances immediately before the user utterance in a case where the user utterance is of type A, and generates a system response to reutter a part of system utterances immediately before the user utterance in a case where the user utterance is of type B.

With this configuration, a device and a method that determine an utterance type of a user utterance and generate a system response according to a determination result are achieved.

REFERENCE SIGNS LIST

10 Information processing device
12 Microphone
13 Display unit
14 Speaker
20 Server
30 External device
101 Voice input unit
102 Voice output unit
103 Image output unit
120 Data processing unit
121 Voice recognition unit
122 User utterance type determination unit
130 Learning processing unit
140 System response generation unit
141 Reutterance processing unit (type A, B processing unit)
142 General question processing unit (type C processing unit)
143 Task processing unit
151 Voice synthesis unit
152 Display image generation unit
160 Storage unit
161 System utterance
162 Learning data & estimation model
163 Morphological analysis dictionary
170 Communication unit
410 Information processing device
420 Service providing server
460 Data processing server
501 CPU
502 ROM
503 RAM
504 Bus
505 Input-output interface
506 Input unit
507 Output unit
508 Storage unit
509 Communication unit
510 Drive
511 Removable medium

The invention claimed is:

1. An information processing device comprising:
a central processing unit (CPU) configured to:
determine an utterance type of a user utterance;
generate a system response according to a type determination result associated with the determined utterance type of the user utterance,
wherein the type determination result associated with the determined utterance type of the user utterance includes:
a (Type A) user utterance that requests all reutterances of a system utterance immediately before the user utterance,
a (Type B) user utterance that requests a reutterance of a part of the system utterance immediately before the user utterance, and
a (Other type) user utterance of a task request type;

generate a system response to reutter all system utterances immediately before the user utterance in a case where the user utterance is of the type A;

generate a system response to reutter a part of system utterances immediately before the user utterance in a case where the user utterance is of the type B; and generate a system response as a result of executing a requested task of the user utterance in a case where the user utterance is of the other type, wherein the requested task is determined based on:
a system utterance immediately before the user utterance, and
a past dialog history including at least one of: a set of past user utterances, a set of past system responses corresponding to the set of user utterances, and a set of past execution results corresponding to the set of user utterances.

2. The information processing device according to claim 1, wherein the type determination result associated with the determined utterance type of the user utterance further includes:
a (Type C) User utterance asking general knowledge, and wherein the CPU is further configured to:
generate a system response including an answer to a question of the user utterance in a case where the user utterance is of the type C.

3. The information processing device according to claim 1, wherein in a case where the user utterance is determined to be the (Type B) user utterance that requests a reutterance of a part of the system utterance immediately before the user utterance, the CPU is further configured to:
determine which type of type B1, B2, or B3 the user utterance is, wherein
the (Type B1) user utterance requesting a reutterance of a specified position part of the system utterance,
the (Type B2) user utterance requesting a reutterance of a specified time-series part of the system utterance, or
the (Type B3) user utterance requesting a partial reutterance other than the B1 and B2.

4. The information processing device according to claim 3, wherein in a case where the user utterance is of the type B1, the CPU is further configured to:
analyze a user utterance text, which is a voice recognition result of the user utterance; and
select a reutterance part of the system utterance.

5. The information processing device according to claim 4, wherein a label indicating of the utterance type of the user utterance is used to identify a phrase immediately before or immediately after the reutterance part to be selected from the system utterance.

6. The information processing device according to claim 3, wherein in a case where the user utterance is of the type B2, the CPU is further configured to:
analyze a user utterance text, which is a voice recognition result of the user utterance;
extract a reference event to be a time-series reference, and further determine a time-series direction of whether the reutterance request event is in past or future of the reference event; and
select a reutterance part of the system utterance on a basis of the reference event and the time-series direction.

7. The information processing device according to claim 6, wherein in a case where it is determined that the reutterance request event is in the past of the reference event, the CPU is further configured to:

select, as the reutterance part, a phrase that includes an event that occurs or has occurred before the reference event from the system utterance.

8. The information processing device according to claim 6, wherein in a case where it is determined that the reutterance request event is the future of the reference event, the CPU is further configured to:
select, as the reutterance part, a phrase that includes an event that occurs or has occurred after the reference event from the system utterance.

9. An information processing system comprising a user terminal and a data processing server,
wherein the user terminal includes a first central processing unit (CPU) configured to:
receive inputs including a user utterance, and
transmit the received inputs including the user utterance to the data processing server, and
the data processing server includes a second CPU configured to:
determine an utterance type of the user utterance received from the user terminal,
generate a system response according to a type determination result associated with the determined utterance type of the user utterance,
wherein the type determination result associated with the determined utterance type of the user utterance includes:
a (Type A) user utterance that requests all reutterances of a system utterance immediately before the user utterance,
a (Type B) user utterance that requests a reutterance of a part of the system utterance immediately before the user utterance, and
a (Other type) user utterance of a task request type,
generate a system response to reutter all system utterances immediately before the user utterance in a case where the user utterance is of the type A;
generate a system response to reutter a part of system utterances immediately before the user utterance in a case where the user utterance is of the type B, and
generate a system response as a result of executing a requested task of the user utterance in a case where the user utterance is of the other type,
wherein the requested task is determined based on:
a system utterance immediately before the user utterance, and
a past dialog history including at least one of: a set of past user utterances, a set of past system responses corresponding to the set of user utterances, and a set of past execution results corresponding to the set of user utterances.

10. An information processing method, comprising:
in an information processing device:
determining an utterance type of a user utterance;
generating a system response according to a type determination result associated with the determined utterance type of the user utterance,
wherein the type determination result associated with the determined utterance type of the user utterance includes:
a (Type A) user utterance that requests all reutterances of a system utterance immediately before the user utterance,
a (Type B) user utterance that requests a reutterance of a part of the system utterance immediately before the user utterance, and
a (Other type) user utterance of a task request type;

generating a system response to reutter all system utterances immediately before the user utterance in a case where the user utterance is of the type A;
generating a system response to reutter a part of system utterances immediately before the user utterance in a case where the user utterance is of the type B; and
generating a system response as a result of executing a requested task of the user utterance in a case where the user utterance is of the other type,
wherein the requested task is determined based on:
a system utterance immediately before the user utterance, and
a past dialog history including at least one of: a set of past user utterances, a set of past system responses corresponding to the set of user utterances, and a set of past execution results corresponding to the set of user utterances.

11. An information processing method executed in an information processing system including a user terminal and a data processing server, wherein the information processing method comprising:
in the user terminal:
inputting a user utterance via a voice input unit and transmitting the user utterance to the data processing server; and
in the data processing server:
determining an utterance type of the user utterance received from the user terminal;
generating a system response according to a type determination result associated with the determined utterance type of the user utterance,
wherein the type determination result associated with the determined utterance type of the user utterance includes:
a (Type A) user utterance that requests all reutterances of a system utterance immediately before the user utterance,
a (Type B) user utterance that requests a reutterance of a part of the system utterance immediately before the user utterance, and
a (Other type) user utterance of a task request type;
generating a system response to reutter all system utterances immediately before the user utterance in a case where the user utterance is of the type A;
generating a system response to reutter a part of system utterances immediately before the user utterance in a case where the user utterance is of the type B; and
generating a system response as a result of executing a requested task of the user utterance in a case where the user utterance is of the other type,
wherein the requested task is determined based on:
a system utterance immediately before the user utterance, and
a past dialog history including at least one of: a set of past user utterances, a set of past system responses corresponding to the set of user utterances, and a set of past execution results corresponding to the set of user utterances.

12. A non-transitory computer-readable medium having stored thereon, computer-executable instructions that when executed by an information processing device causes the information processing device to execute information processing operations comprising:
determining an utterance type of a user utterance;
generating a system response according to a type determination result associated with the determined utterance type of the user utterance,
wherein the type determination result associated with the determined utterance type of the user utterance includes:
a (Type A) user utterance that requests all reutterances of a system utterance immediately before the user utterance,
a (Type B) user utterance that requests a reutterance of a part of the system utterance immediately before the user utterance, and
a (Other type) user utterance of a task request type;
generating a system response to reutter all system utterances immediately before the user utterance in a case where the user utterance is of the type A
generating a system response to reutter a part of system utterances immediately before the user utterance in a case where the user utterance is of the type B; and
generating a system response as a result of executing a requested task of the user utterance in a case where the user utterance is of the other type,
wherein the requested task is determined based on:
a system utterance immediately before the user utterance, and
a past dialog history including at least one of: a set of past user utterances, a set of past system responses corresponding to the set of user utterances, and a set of past execution results corresponding to the set of user utterances.

* * * * *